United States Patent
Fujimoto et al.

(10) Patent No.: US 7,618,484 B2
(45) Date of Patent: Nov. 17, 2009

(54) INK JET INK, INK JET RECORDING METHOD, INK CARTRIDGE, RECORDING UNIT AND INK JET RECORDING APPARATUS

(75) Inventors: Kuniaki Fujimoto, Chofu (JP); Jun Yoshizawa, Tokyo (JP); Minako Kawabe, Koganei (JP); Daiji Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/107,414

(22) Filed: Apr. 22, 2008

(65) Prior Publication Data

US 2008/0274284 A1 Nov. 6, 2008

(30) Foreign Application Priority Data

May 1, 2007 (JP) .............................. 2007-120475
Apr. 16, 2008 (JP) .............................. 2008-107005

(51) Int. Cl.
*C09D 11/02* (2006.01)
*B41J 2/01* (2006.01)

(52) U.S. Cl. .................. 106/31.47; 106/31.48; 347/100

(58) Field of Classification Search .............. 106/31.47, 106/31.48; 347/100
See application file for complete search history.

(56) References Cited

U.S. PATENT DOCUMENTS

| | | | | |
|---|---|---|---|---|
| 4,202,870 A | 5/1980 | Weber et al. | ................ | 423/630 |
| 4,242,271 A | 12/1980 | Weber et al. | ................ | 260/448 |
| 4,391,960 A | 7/1983 | Kleine et al. | .................. | 526/74 |
| 4,723,129 A | 2/1988 | Endo et al. | .................... | 346/1.1 |
| 4,740,796 A | 4/1988 | Endo et al. | .................... | 346/1.1 |
| 5,599,386 A | 2/1997 | Sano et al. | ................ | 106/22 R |
| 6,852,154 B2 * | 2/2005 | Kitamura et al. | ......... | 106/31.47 |
| 6,929,361 B2 | 8/2005 | Matsumoto et al. | ......... | 347/100 |
| 6,966,944 B2 | 11/2005 | Shimomura et al. | ...... | 106/31.43 |
| 6,984,032 B2 * | 1/2006 | Kitamura et al. | ......... | 106/31.47 |
| 7,015,327 B2 | 3/2006 | Matsumoto et al. | ........... | 546/76 |
| 7,144,452 B2 | 12/2006 | Takayama et al. | ........ | 106/31.52 |
| 7,160,372 B2 | 1/2007 | Yoshizawa et al. | ....... | 106/31.47 |
| 7,198,664 B2 | 4/2007 | Mafune et al. | ........... | 106/31.28 |
| 7,198,665 B2 | 4/2007 | Nakamura et al. | ....... | 106/31.52 |
| 7,201,791 B2 | 4/2007 | Okamura et al. | ......... | 106/31.47 |

(Continued)

FOREIGN PATENT DOCUMENTS

JP          57-044605          3/1982

(Continued)

OTHER PUBLICATIONS

Machine translation of JO 2005/307068, Nov. 2005.*

*Primary Examiner*—Helene Klemanski
(74) *Attorney, Agent, or Firm*—Fitzpatrick, Cella, Harper & Scinto

(57) ABSTRACT

The present invention provides an ink jet ink having a magenta color which gives an image excellent in magenta color tone and also excellent in image fastness (lightfastness and gas resistance). The ink jet ink includes a first coloring material that is an anthrapyridone compound having a structure represented by general formula (I) and/or general formula (II) and a second coloring material that is an azo compound having a structure represented by general formula (III), wherein the mass ratio of the content of the first coloring material to the content of the second coloring material is from 2.5 or more to 10.0 or less.

11 Claims, 6 Drawing Sheets

U.S. PATENT DOCUMENTS

| | | |
|---|---|---|
| 7,208,033 B2 | 4/2007 | Kawabe et al. ............ 106/31.48 |
| 7,211,132 B2 * | 5/2007 | Oki et al. ................. 106/31.47 |
| 7,223,301 B2 | 5/2007 | Matsumoto et al. ...... 106/31.47 |
| 7,226,498 B2 | 6/2007 | Yamashita et al. ......... 106/31.5 |
| 7,241,332 B2 | 7/2007 | Yoshizawa et al. ....... 106/31.47 |
| 7,244,299 B2 | 7/2007 | Tsuji et al. ............... 106/31.48 |
| 7,247,194 B2 | 7/2007 | Okamura et al. .......... 106/31.47 |
| 7,247,196 B2 | 7/2007 | Sato et al. ................ 106/31.52 |
| 7,270,701 B2 | 9/2007 | Jinnou et al. ............. 106/31.47 |
| 7,285,159 B2 | 10/2007 | Aikawa et al. ........... 106/31.47 |
| 7,294,184 B2 | 11/2007 | Fujimoto et al. ......... 106/31.47 |
| 7,297,194 B2 | 11/2007 | Shinjo et al. ............. 106/31.27 |
| 7,297,196 B2 | 11/2007 | Matsumoto et al. ...... 106/31.47 |
| 7,297,197 B2 | 11/2007 | Jinnou et al. ............. 106/31.47 |
| 7,323,045 B2 | 1/2008 | Hanmura et al. ......... 106/31.47 |
| 7,364,770 B2 | 4/2008 | Nagashima et al. ........ 427/215 |
| 7,416,592 B2 * | 8/2008 | Kitamura et al. ......... 106/31.47 |
| 2004/0239739 A1 | 12/2004 | Matsumoto et al. ........ 347/100 |
| 2005/0115459 A1 | 6/2005 | Hanmura et al. ......... 106/31.47 |
| 2005/0171351 A1 | 8/2005 | Matsumoto et al. ........... 546/76 |
| 2006/0009357 A1 | 1/2006 | Fujiwara et al. ............. 503/227 |
| 2006/0103705 A1 | 5/2006 | Yoshizawa et al. .......... 347/100 |
| 2006/0125896 A1 | 6/2006 | Aikawa et al. .............. 347/100 |
| 2006/0152570 A1 | 7/2006 | Ishikawa et al. ............ 347/105 |
| 2006/0194897 A1 | 8/2006 | Kawabe et al. .............. 523/160 |
| 2006/0219131 A1 | 10/2006 | Matsumoto et al. ...... 106/31.47 |
| 2007/0062413 A1 | 3/2007 | Matsumoto et al. ...... 106/31.47 |
| 2007/0277701 A1 | 12/2007 | Toyoda et al. ............ 106/31.48 |
| 2008/0007606 A1 | 1/2008 | Yanagimachi et al. ....... 347/100 |
| 2008/0018722 A1 | 1/2008 | Mafune et al. .............. 347/100 |
| 2009/0047430 A1 * | 2/2009 | Mori et al. ................ 106/31.48 |

FOREIGN PATENT DOCUMENTS

| | | |
|---|---|---|
| JP | 08-073791 | 3/1996 |
| JP | 09-255882 | 9/1997 |
| JP | 2803134 B2 | 9/1998 |
| JP | 2881847 B2 | 4/1999 |
| JP | 2002-371213 | 12/2002 |
| JP | 2003-192930 | 7/2003 |
| JP | 2005-008868 | 1/2005 |
| JP | 2005-105136 | 4/2005 |
| JP | 2005-307068 | 11/2005 |
| JP | 2006-143989 | 6/2006 |
| WO | WO 2004/104108 A1 | 12/2004 |

* cited by examiner

INK JET INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink jet ink, an ink jet recording method, an ink cartridge, a recording unit and an ink jet recording apparatus.

2. Description of the Related Art

An ink jet recording method is a method of forming images by applying ink droplets to recording media such as plain paper and glossy media. This method has rapidly come into widespread use by the reduction in cost and improvement in recording speed of ink jet recording apparatuses. Further, with the rapid spread of digital cameras in addition to the progress in obtaining high-quality images by the ink jet recording method, the ink jet recording method has been commonly used as the output method of images equal to silver halide photographs.

In recent years, further progress in obtaining high-quality images is achieved by minimization of ink droplets and improvement in the color gamut accompanying introduction of a multicolor ink. On the other hand, the demand to a coloring material and ink becomes higher, wherein severer properties are demanded in the improvement in color developabilities and reliability of clogging and ejection stability.

On the other hand, it is mentioned that the ink jet recording method is inferior in the image storage stability of the obtained recorded matter, as a problem of the ink jet recording method. Generally, the image storage stability of the recorded matter obtained by the ink jet recording method is low as compared with silver halide photographs. When a recorded matter is specifically exposed to light, humidity, heat, the environmental gas that is present in the air, etc. for a long time, there is a problem that the coloring material on the recorded matter deteriorates and is easy to generate the change of color tone and fading of images.

Especially, from the viewpoint of the fastness of the images formed using a dye ink which contains a dye as a coloring material, particularly lightfastness, the lowness of the lightfastness accompanying a chemical reaction peculiar to the coloring material has been a subject. Many proposals have been made to solve the problem of this lightfastness to enhance the lightfastness of images. In particular, many proposals have been made with respect to a dye used for magenta ink, which has a low image storage stability in each ink of cyan, magenta and yellow.

For example, there are proposals on a xanthene dye and an azo dye using H acid as a coloring material which can form images excellent in image storage stability such as water resistance and color tone (Japanese Patent Application Laid-Open No. H08-073791 and Japanese Patent Application Laid-Open No. H09-255882). However, a xanthene dye is very excellent in color tone, but it is very inferior in lightfastness. On the other hand, an azo dye using H acid may have good color tone, but it is inferior in lightfastness and gas resistance. Although a study for developing a magenta dye excellent in color tone and lightfastness has been widely performed on these types of dye, it still cannot be said that the lightfastness level is enough as compared with a dye having other hues such as a cyan dye typified by copper phthalocyanine dyes and a yellow dye.

Further, there is a proposal on an anthrapyridone dye as a magenta dye excellent in color tone and lightfastness (Japanese Patent Application Laid-Open No. 2005-008868). However, a magenta dye satisfying clarity, gas resistance, and lightfastness equal to a dye having other hues is not yet obtained.

There are proposals on a magenta ink which can form images excellent in color tone, and ozone resistance and lightfastness by containing an anthrapyridone dye and an azo dye (Japanese Patent Application Laid-Open No. 2005-105136 and Japanese Patent Application Laid-Open No. 2005-307068). These proposals describe that a magenta ink which can form images excellent in both high gas resistance and lightfastness can be obtained by using an anthrapyridone dye with high gas resistance and low lightfastness together with an azo dye with low gas resistance and high lightfastness, thereby compensating mutual characteristics. However, although an image formed by such an ink containing both an anthrapyridone dye and an azo dye has gas resistance and lightfastness which have been improved to some extent as compared with an image formed by an ink containing only one of an anthrapyridone dye and an azo dye as a coloring material, the level of the fastness demanded in recent years is not reached.

SUMMARY OF THE INVENTION

Therefore, an object of the present invention is to provide an ink jet ink having a magenta color tone which gives an image excellent in color tone, lightfastness, and gas resistance. Furthermore an object of the present invention is to provide an ink jet ink having a magenta color tone which gives an image excellent in color tone, lightfastness, gas resistance, and optical density. Another object of the present invention is to provide an ink jet recording method, an ink cartridge, a recording unit and an ink jet recording apparatus, all using the above ink jet ink.

The above objects are achieved by the present invention. Specifically, the ink jet ink according to an embodiment of the present invention comprises at least two coloring materials of a first coloring material and a second coloring material, the first coloring material being at least one of a compound represented by the following general formula (I):

General formula (I)

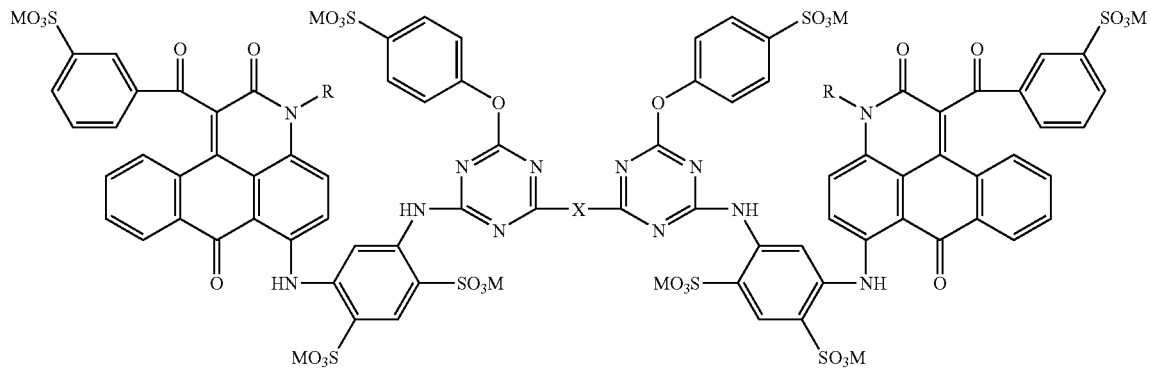

(wherein R independently represents a hydrogen atom, an alkyl group, a hydroxyalkyl group, a cyclohexyl group a monoalkylaminoalkyl group or a dialkylaminoalkyl group; M independently represents a hydrogen atom, an alkali metal, ammonium or organic ammonium; and X represents a linking group) and a compound represented by the following general formula (II):

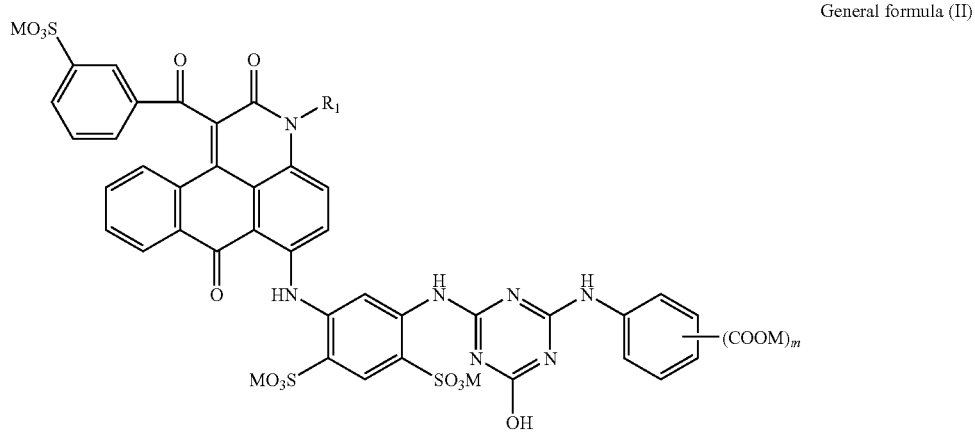

General formula (II)

(wherein $R_1$ represents a hydrogen atom or an alkyl group; m represents an integer of 1 to 3; and M independently represents a hydrogen atom, an alkali metal, ammonium or organic ammonium); and the second coloring material being a compound represented by the following general formula (III):

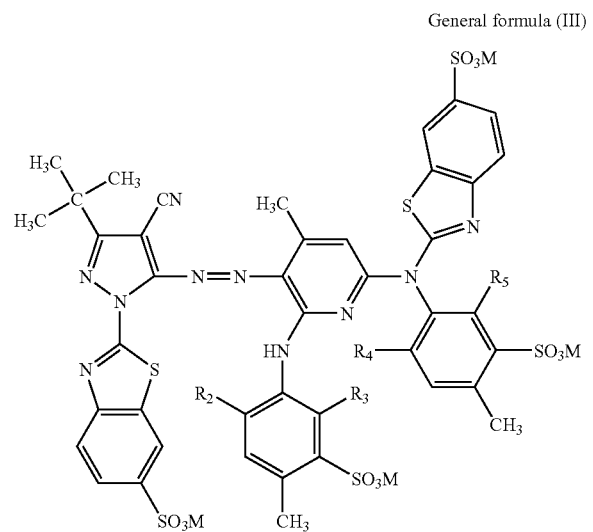

General formula (III)

(wherein $R_2$, $R_3$, $R_4$, and $R_5$ each independently represent an alkyl group; and M independently represents a hydrogen atom, an alkali metal, ammonium or organic ammonium), wherein the mass ratio of the content (% by mass) of the first coloring material to the content (% by mass) of the second coloring material is from 2.5 or more to 10.0 or less.

Further, an ink jet recording method according to another embodiment of the present invention is an ink jet recording method in which ink is ejected by an ink jet system to perform recording on a recording medium by ejecting ink by an ink jet system, wherein the ink is an ink jet ink of the above constitution.

Further, an ink cartridge according to another embodiment of the present invention is an ink cartridge provided with an ink storage portion for storing ink, wherein the ink is an ink jet ink of the above constitution.

Further, a recording unit according to another embodiment of the present invention is a recording unit provided with an ink storage portion for storing ink and a recording head for ejecting ink, wherein the ink is an ink jet ink of the above constitution.

Further, an ink jet recording apparatus according to another embodiment of the present invention is an ink jet recording apparatus provided with an ink storage portion for storing ink and a recording head for ejecting ink, wherein the ink is an ink jet ink of the above constitution.

An embodiment of the present invention can provide an ink jet ink which gives an image excellent in color tone, lightfastness and gas resistance. Furthermore an embodiment of the present invention can provide an ink jet ink having a magenta color tone which gives an image excellent in color tone, lightfastness, gas resistance, and optical density. Another embodiment of the present invention can provide an ink jet recording method, an ink cartridge, a recording unit and an ink jet recording apparatus, all using the above ink jet ink.

DESCRIPTION OF THE EMBODIMENTS

Figure 1:
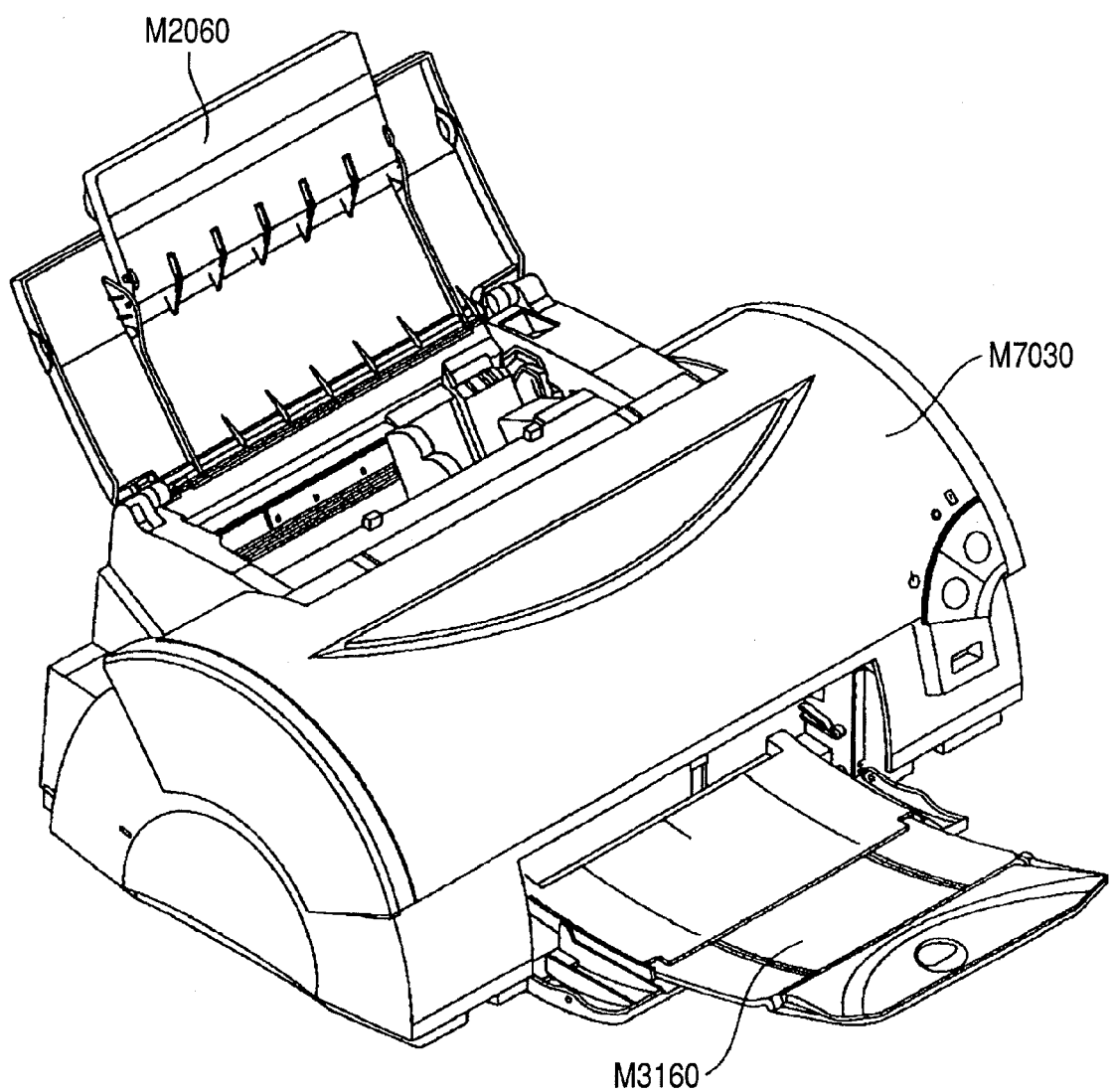
FIG. 1 is a perspective view of an ink jet recording apparatus.

Preferred embodiments of the present invention are listed below and described in detail.

Note that, when a compound is a salt, the salt dissociates to and is present as ions in ink, but, for convenience, this state is described as "the ink contains a salt" in the present invention.

<Ink>

The components comprising the ink jet ink (hereinafter, may only be referred to the ink) of the present invention will be described in detail below. Note that a compound represented by the general formula (I), a compound represented by the general formula (II) and a compound represented by the general formula (III) may be abbreviated to "a compound of the general formula (I)", "a compound of the general formula (II)" and "a compound of the general formula (III)", respectively.

As a result of studies by the present inventors, it has been found that an image having both excellent lightfastness and desirable color tone as magenta ink can be obtained by an ink composition containing an anthrapyridone dye together with an azo dye, each dye having a specific structure, in a specific ratio.

One of the features of the ink of the present invention is a combined use of a compound of the following general formula (I) and/or a compound of the following general formula (II), each representing an anthrapyridone dye, as a first coloring material, and a compound of the following general formula (III) which represents an azo dye as a second coloring material.

<First Coloring Material: A Compound Represented by the General Formula (I) and/or a Compound Represented by the General Formula (II)>

The ink of the present invention needs to contain a compound of the following general formula (I) and/or a compound of the following general formula (II), each having the features of excellent color tone and lightfastness, as a first coloring material. In the present invention, it is particularly preferred to use a compound of the general formula (I) as the first coloring material. Hereinafter, these general formulas will be described.

General formula (I)

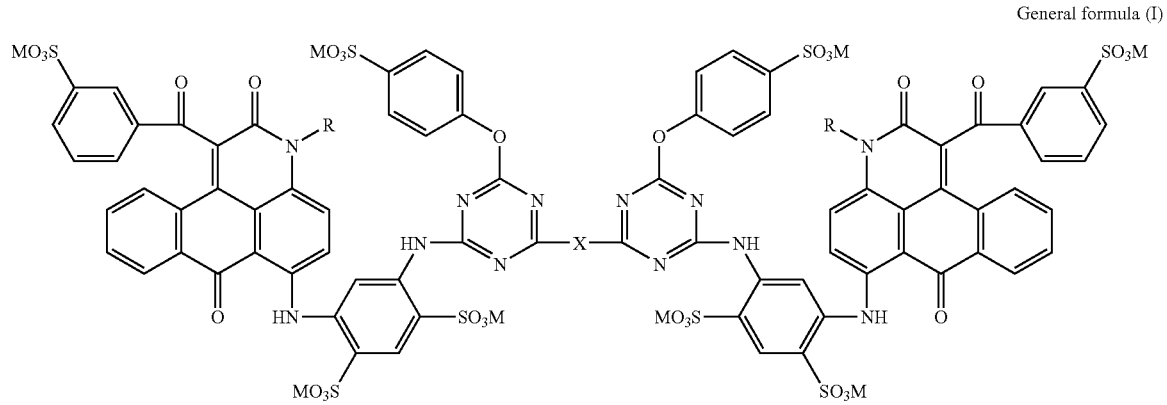

In the general formula (I), R independently represents a hydrogen atom, an alkyl group, a hydroxyalkyl group, a cyclohexyl group a monoalkylaminoalkyl group or a dialkylaminoalkyl group; M independently represents a hydrogen atom, an alkali metal, ammonium or organic ammonium; and X represents a linking group.

General formula (II)

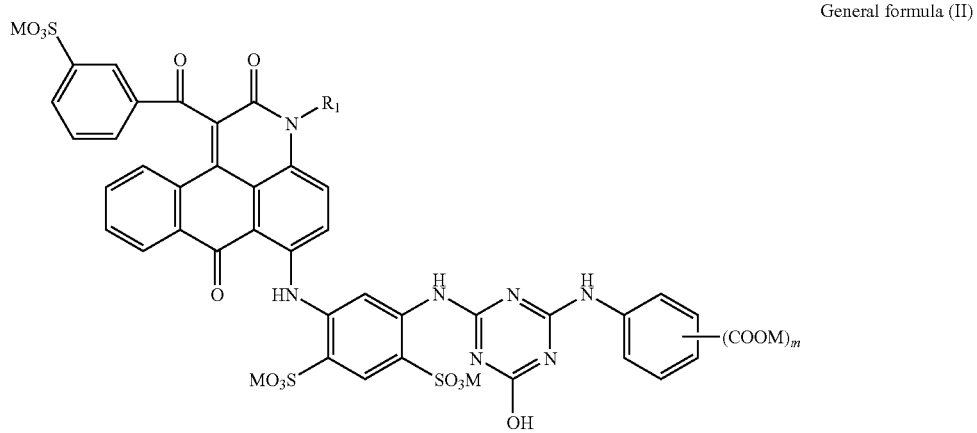

In the general formula (II), $R_1$ represents a hydrogen atom or an alkyl group; m represents an integer of 1 to 3; and M independently represents a hydrogen atom, an alkali metal, ammonium or organic ammonium.

R in the general formula (I) independently represents a hydrogen atom, an alkyl group, a hydroxyalkyl group, a cyclohexyl group a monoalkylaminoalkyl group or a dialkylaminoalkyl group.

As the alkyl group, an alkyl group having 1 to 8 carbon atoms can be mentioned. Specific examples include methyl, ethyl, n-propyl, iso-propyl, n-butyl, sec-butyl, t-butyl, iso-butyl, n-pentyl, n-hexyl, n-heptyl and n-octyl groups.

As the hydroxyalkyl group, a hydroxyalkyl group having 1 to 4 carbon atoms can be mentioned. Specific examples include hydroxymethyl, hydroxyethyl, hydroxypropyl and hydroxybutyl groups. The alkyl in the hydroxyalkyl group includes linear, branched and cyclic alkyl, and linear alkyl is particularly preferred. The position of substitution of hydroxy in the above alkyl may be arbitrarily selected, but particularly preferred is the hydroxy that is substituted at an end, for example, 2-hydroxyethyl, 3-hydroxypropyl and 4-hydroxy butyl.

As the monoalkylaminoalkyl group, a mono($C_{1-4}$)alkylamino($C_{1-4}$)alkyl group can be mentioned. Specific examples include monomethylaminopropyl and monoethylaminopropyl.

As the dialkylaminoalkyl group, a di($C_{1-4}$)alkylamino($C_{1-4}$)alkyl group can be mentioned. Specific examples include dimethylaminopropyl and diethylaminoethyl.

In the present invention, R in the general formula (I) is preferably one of a hydrogen atom, an alkyl group and a cyclohexyl group, more preferably one of a hydrogen atom and an alkyl group, most preferably a methyl group.

The X in the general formula (I) represents a linking group. Examples of the linking group include the following linking groups 1 to 7. In the linking groups 1 to 7, the bonding hand represented by the symbol "*" is a bonding hand of each nitrogen atom, and one of two different triazine rings is directly bonded to each of the nitrogen atoms. It is particularly preferred to use a linking group 1 in the following linking groups.

Linking Group 1

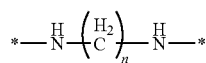

In the linking group 1, n represents 2 to 8, preferably 2 to 6, more preferably 2; and the symbol "*" each represents a binding site to one of two different triazine rings.

Linking Group 2

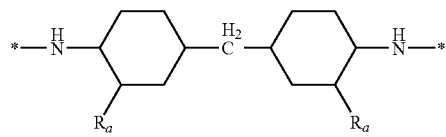

In the linking group 2, $R_a$ independently represents a hydrogen atom or a methyl group; and the symbol "*" each represents a binding site to one of two different triazine rings.

Linking Group 3

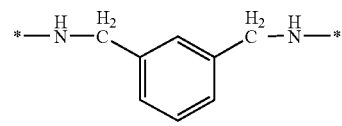

In the linking group 3, the symbol "*" each represents a binding site to one of two different triazine rings.

Linking Group 4

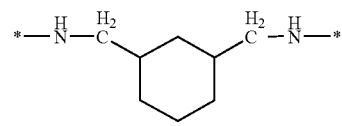

In the linking group 4, the symbol "*" each represents a binding site to one of two different triazine rings.

Linking Group 5

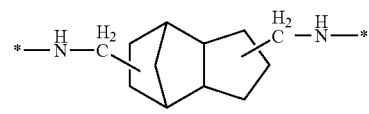

In the linking group 5, the symbol "*" each represents a binding site to one of two different triazine rings.

Linking Group 6

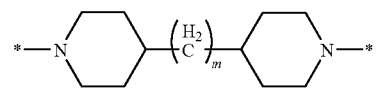

In the linking group 6, m represents 2 to 4; and the symbol "*" each represents a binding site to one of two different triazine rings.

Linking Group 7

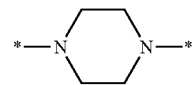

In the linking group 7, the symbol "*" each represents a binding site to one of two different triazine rings.

In the general formulas (I) and (II), M independently represents one of a hydrogen atom, an alkali metal, ammonium and organic ammonium. Examples of the alkali metal include lithium, sodium and potassium. Examples of the organic ammonium include acetamide, benzamide, trimethylamino, butylamino, diethylamino, phenylamino and triethanolamino.

The alkyl group in the general formula (II) preferably has 1 to 3 carbon atoms in terms of solubility in an aqueous medium comprising ink, and specific examples include a methyl group, an ethyl group, a primary propyl group and a secondary propyl group. Note that, when the alkyl group has 4 or more carbon atoms, the hydrophobicity of a coloring material may be too high for the coloring material to be dissolved in an aqueous medium comprising ink.

Preferred examples of a compound of the general formula (I) and a compound of the general formula (II) include the following exemplified compounds 1 to 4. Note that the following exemplified compounds are described in the form of a free acid. Of course, the present invention is not limited to the following exemplified compounds as long as a compound is included in the structure of one of the general formula (I) and the general formula (II) and the definition thereof. In the present invention, it is particularly preferred to use one of an exemplified compound 1 and an exemplified compound 3 in the following exemplified compounds. Among them, the exemplified compound 1 is most preferably used.

Exemplified compound 1

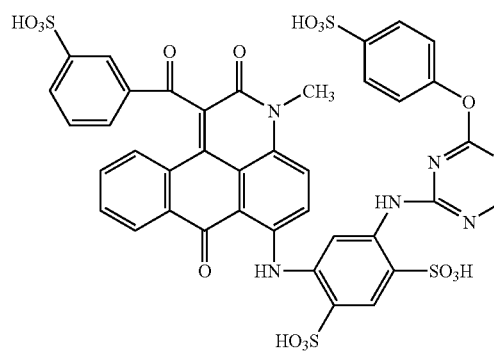
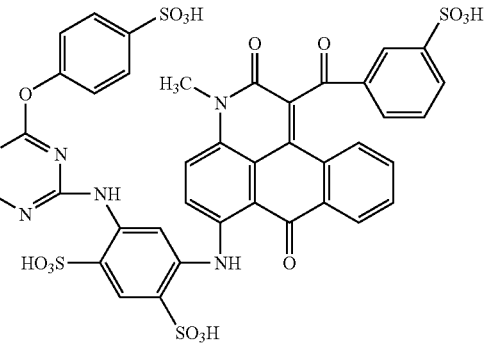

Exemplified compound 2

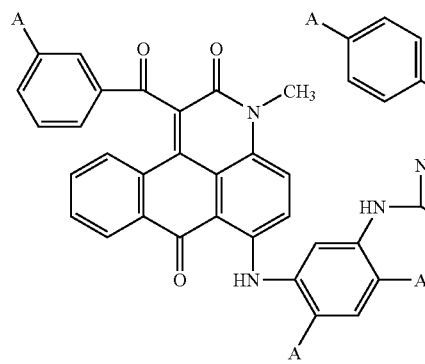

[A in the formula: $SO_3^- \cdot HN^+(CH_2CH_2OH)_3$]

Exemplified compound 3

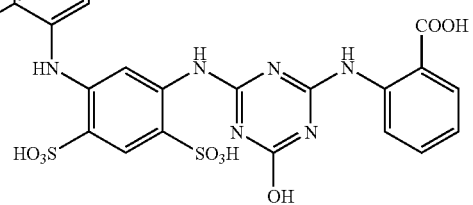

-continued

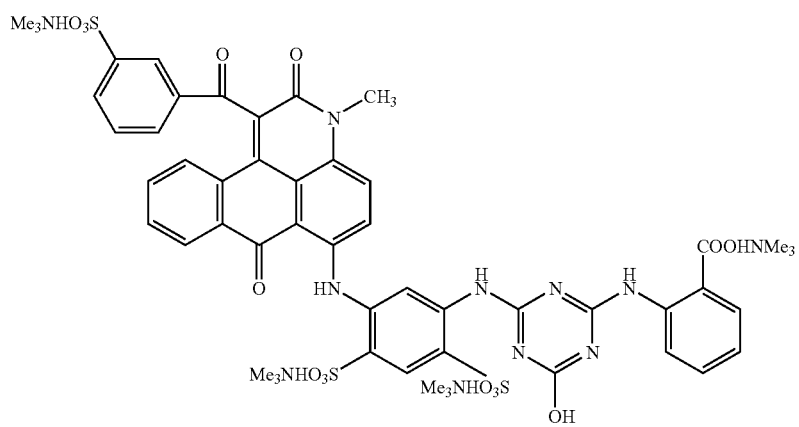

Exemplified compound 4

[SO₃HNMe₃: $SO_3^-\cdot HN^+(CH_3)_3$, COOHNMe₃: $COO^-\cdot HN^+(CH_3)_3$]

[Second Coloring Material: a Compound Represented by the General Formula (III)]

The ink of the present invention needs to contain a compound of the following general formula (III) which is particularly excellent in color tone, as a second coloring material.

General formula (III)

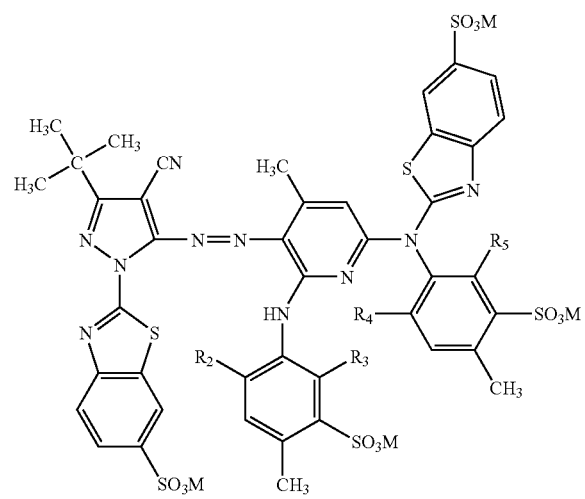

In the general formula (III), $R_2$, $R_3$, $R_4$ and $R_5$ each independently represent an alkyl group; and M independently represents a hydrogen atom, an alkali metal, ammonium or organic ammonium.

The alkyl group in the general formula (III) preferably has 1 to 3 carbon atoms in terms of solubility in an aqueous medium comprising ink, and specific examples include a methyl group, an ethyl group, a primary propyl group and a secondary propyl group. Note that, when the alkyl group has 4 or more carbon atoms, the hydrophobicity of a coloring material may be too high for the coloring material to be dissolved in an aqueous medium comprising ink.

In the general formula (III), M independently represents one of a hydrogen atom, an alkali metal, ammonium and organic ammonium. Examples of the alkali metal include lithium, sodium and potassium. Examples of the organic ammonium include acetamide, benzamide, methylamino, butylamino, diethylamino, triethylamino and phenylamino.

Preferred examples of a compound of the general formula (III) include the following exemplified compounds 5 to 7.

Note that the following exemplified compounds are described in the form of a free acid. Of course, the present invention is not limited to the following exemplified compounds as long as a compound is included in the structure of the general formula (III) and the definition thereof. In the present invention, it is particularly preferred to use an exemplified compound 6 in the following exemplified compounds.

Exemplified compound 5

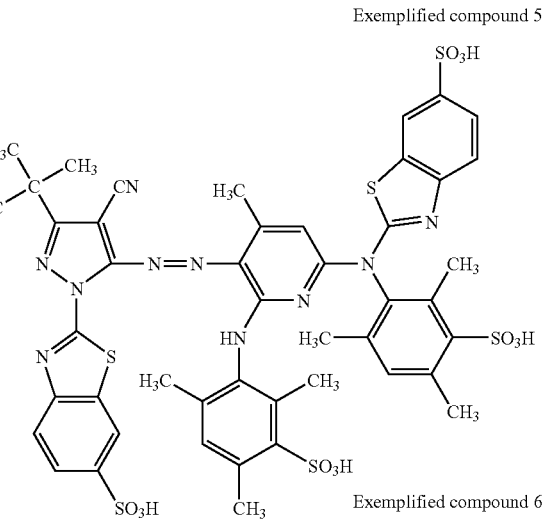

Exemplified compound 6

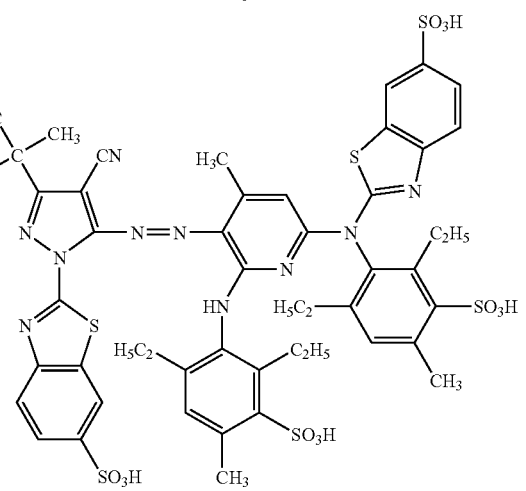

-continued

Exemplified compound 7

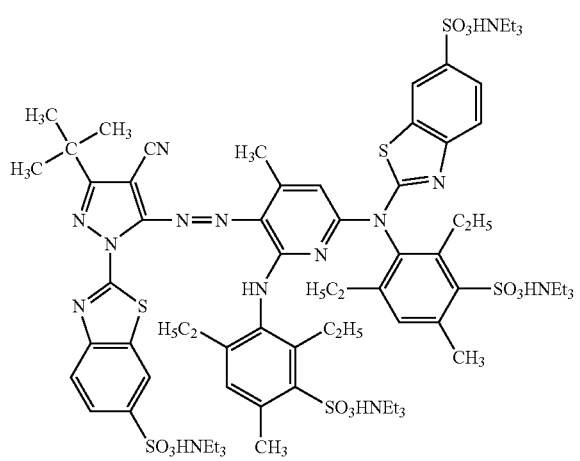

[SO₃HNEt₃: $SO_3^-\cdot HN^+(C_2H_5)_3$]

Note that, in the present invention, the structure of the azo dye used as a second coloring material is limited even if it is a monoazo dye. An image having an excellent lightfastness cannot be obtained by the ink containing one of a compound of the general formula (I) and a compound of the general formula (II), which are anthrapyridone dyes, in combination with the following compound of the general formula (IV) which is an azo dye.

General formula (IV)

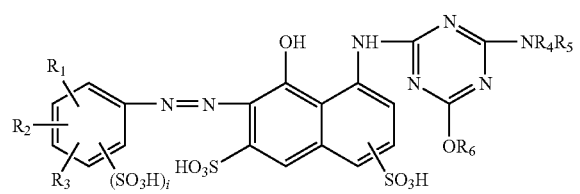

In the general formula (IV), $R_1$, $R_2$ and $R_3$ independently represent a substituted or unsubstituted alkyl group having 1 to 9 carbon atoms, an alkoxy group having 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate group, an alkyl sulfonyl group having 1 to 9 carbon atoms, an arylsulfonyl group having 6 to 15 carbon atoms, a carboxyl group or a carboxylate group; i represents 0, 1 or 2; and $R_4$, $R_5$, and $R_6$ independently represent a hydrogen atom, an alkyl group having 1 to 18 carbon atoms, an alkenyl group having 2 to 18 carbon atoms, an aryl group, an aralkyl group, an alicyclic group or a heterocyclic group, wherein the above groups except a hydrogen atom may have a substituent.

[Content of a Coloring Material]

A compound of the general formula (I) and a compound of the general formula (II) have a bluish magenta color tone, and have the characteristics that the optical density of a recorded matter is low. On the other hand, a compound of the general formula (III) has a yellowish magenta color tone, and has the characteristics that the optical density of a recorded matter is high. In the present invention, an image having a desirable magenta color tone (see below for further details) can be obtained by using one of a compound of the general formula (I) and a compound of the general formula (II) which have the characteristics as described above in combination with a compound of the general formula (III).

The following has been found when the present inventors further studied these coloring materials. That is, the combined use of these coloring materials at a specific mass ratio provides images having a lightfastness far exceeding the performance that is anticipated from the combination of the lightfastness which is individually possessed by a compound of one of the general formula (I) and the general formula (II) and a compound of the general formula (III). The reason why the combined use of these coloring materials at a specific mass ratio exerts a synergistic effect and provides an image having a lightfastness exceeding anticipation is not clear, but the present inventors assume as described below. Note that, in the following description, fixability refers to the amount of adsorbed dye in ink on a porous body having a cationic charge (such as alumina) comprising an ink receiving layer of a recording medium. A low fixability shows that the amount of adsorption of the dye is small, and a high fixability shows that the amount of adsorption of the dye is large.

The result of studies by the present inventors has shown that an anthrapyridone dye such as the compounds of the general formula (I) and the general formula (II) tends to have a lower fixability to an ink receiving layer of a recording medium. When an ink containing such an anthrapyridone dye is applied to a recording medium, the amount of adsorption on a porous body is small because the dye has a characteristic of low fixability. As a result, the dye probably penetrates deep into the ink receiving layer in the thickness direction thereof. On the other hand, the result of studies by the present inventors has shown that an azo dye such as a compound of the general formula (III) tends to have a higher fixability on the ink receiving layer of a recording medium. When an ink containing such an azo dye is applied to a recording medium, the amount of adsorption on a porous body is large because the dye has a characteristic of high fixability. As a result, the dye probably penetrates only shallowly into the ink receiving layer in the thickness direction thereof.

When applying to a recording medium the ink of the present invention containing one of a compound of the general formula (I) and a compound of the general formula (II) which are the anthrapyridone dyes and a compound of the general formula (III) which is an azo dye, all having the above characteristics, respectively, the state is assumed to be as follows. That is, presumably, the compound of the general formula (I) and the compound of the general formula (II) penetrate deep into an ink receiving layer in the thickness direction thereof, and on the other hand, the compound of the general formula (III) penetrates only shallowly into the ink receiving layer in the thickness direction thereof. That is, the compound of the general formula (I) and the compound of the general formula (II) differ in the distribution position in the thickness direction of the ink receiving layer from the compound of the general formula (III). For this reason, presumably, the compound of the general formula (III) distributed over a shallow position in the thickness direction of the ink receiving layer plays a role in suppressing the decomposition by light of the compound of the general formula (I) and the compound of the general formula (II) which are distributed over a deep position in the thickness direction of the ink receiving layer. As a result, it is inferred that the combined use of these coloring materials at a specific mass ratio has enabled us to achieve a lightfastness far exceeding the performance that is anticipated from the combination of the lightfastness which is individually possessed by a compound of one of the general formula (I) and the general formula (II) and a compound of the general formula (III).

Specifically, in order to obtain the effect of the present invention, the mass ratio of the content (% by mass) of a first coloring material to the content (% by mass) of a second coloring material based on the total ink mass, (a first coloring material/a second coloring material), needs to be from 2.5 or more to 10.0 or less. That is, {(the content of one of a compound of the general formula (I) and a compound of the general formula (II))/(the content of a compound of the general formula (III))} needs to be from 2.5 or more to 10.0 or less. The following two synergistic effects beyond anticipation are obtained by combining a first coloring material and a second coloring material so that the mass ratio of the respective contents is in the above described range to prepare ink. First, the first of the synergistic effects is the improvement beyond anticipation of the lightfastness of the image formed by the ink. That is, this synergistic effect provides an image lightfastness far exceeding the lightfastness that is anticipated from the combination of the image lightfastness obtained by one of a compound of the general formula (I) and a compound of the general formula (II) and the lightfastness obtained by a compound of the general formula (III). Next, the second of the synergistic effects is an improvement in the color tone of the image formed by the ink. That is, an image with the color tone desirable as magenta ink can be obtained by the combined use of a first coloring material and a second coloring material so that the mass ratio of the respective contents is in the above described range. Note that these synergistic effects are not exhibited in the case of the ink in which the mass ratio of the contents of a first coloring material and a second coloring material is less than 2.5 or more than 10.0. That is, as compared with the image lightfastness obtained when one of a first coloring material and a second coloring material is independently used, a significant improvement in the lightfastness is not observed, and an image with the color tone desirable as magenta ink cannot be obtained, either.

The result of studies by the present inventors has shown that as compared with the compound of the general formula (I) and the compound of the general formula (II) the compound of the general formula (I) provides an image having superior lightfastness. Accordingly, in the present invention, the compound of the general formula (I) is more preferably used as an anthrapyridone dye which is a first coloring material. That is, the ink is preferably constituted so that a first coloring material contains at least the compound of the general formula (I). The reason why the compound of the general formula (I) provides an image having superior lightfastness as compared with the compound of the general formula (II) is assumed as follows. The compound of the general formula (II) does not have a linking group in a molecule, and therefore, anthrapyridone skeleton is firstly deteriorated in the case of deteriorating the compound of the general formula (II) by means of a light. On the other hand, the compound of the general formula (I) has a linking group in a molecule, and therefore, in the case of deteriorating the compound of the general formula (I) by means of a light, a linking group is firstly deteriorated and then anthrapyridone skeleton is deteriorated. By such mechanism, time taken for entire deterioration of the compound of the general formula (I) become relatively longer than time taken for entire deterioration of the compound of the general formula (II). As the result, the compound of the general formula (I) can provide an image having superior lightfastness as compared with the compound of the general formula (II).

Further, in the present invention, the following conditions are preferably satisfied in order to obtain an ink which provides an image having particularly excellent lightfastness and gas resistance and an image having a particularly desirable color tone as magenta ink. That is, in the ink of the present invention, it is particularly preferred that the first coloring material is a compound of the above general formula (I); the second coloring material is a compound of the above general formula (III); and (the first coloring material/the second coloring material) is from 3.0 or more to 10.0 or less. Further, it is particularly preferred that (the first coloring material/the second coloring material) is from 9.0 or more to 10.0 or less.

Specifically, the desirable color tone as magenta ink in the present invention means the followings. The image formed using magenta ink by setting the recording duty as 100% is measured for a* and b* in the L*a*b* calorimetric system specified by CIE (International Commission on Illumination), and the hue angle (H°) is calculated from the resulting values of a* and b* based on the following formula (A). The ink having a hue angle (H°) of from 0 or more to 5 or less or from 350 or more to less than 360 is defined as the magenta ink having a desirable color tone in the present invention. Further, it is particularly preferred that the hue angle (H°) calculated based on the following formula (A) is from 0 or more to 5 or less. Note that the values of the above a* and b* can be measured, for example, using a spectrophotometer (trade name: Spectrolino; manufactured by Gretag Macbeth). Of course, the present invention is not limited to the above measurement.

In $a^* \geq 0$, $b^* \geq 0$ (the first quadrant): $H° = \tan^{-1}(b^*/a^*)$

In $a^* \leq 0$, $b^* \geq 0$ (the second quadrant): $H° = 180 + \tan^{-1}(b^*/a^*)$ In $a^* \leq 0$, $b^* \leq 0$ (the third quadrant): $H° = 180 + \tan^{-1}(b^*/a^*)$ In $a^* \geq 0$, $b^* \leq 0$ (the fourth quadrant): $H° = 360 + \tan^{-1}(b^*/a^*)$    Formula (A)

As described above, the ink of the present invention requires that the content (% by mass) of a compound of one of the general formula (I) and the general formula (II) (hereinafter referred to as a first coloring material) is in a specific ratio to the content (% by mass) of a compound of the general formula (III) (hereinafter referred to as a second coloring material). That is, the mass ratio of the contents of these coloring materials in ink needs to be from 2.5 or more to 10.0 or less, that is, (a first coloring material/a second coloring material)=from 2.5 to 10.0. Further, it is particularly preferred that the ink of the present invention is in the form in which the content of each coloring material satisfies the following constitution. First, the content (% by mass) of the first coloring material in ink is preferably in the range of from 2.5% by mass or more to 10.0% by mass or less based on the total ink mass. Further, the content (% by mass) of the second coloring material in ink is preferably in the range of from 0.5% by mass or more to 2.0% by mass or less based on the total ink mass. Furthermore, the sum of the contents (% by mass) of the first coloring material and the second coloring material in ink is preferably in the range of from 4.0% by mass or more to 10.0% by mass or less based on the total ink mass. The sum of the contents (% by mass) of the coloring materials in ink of less than 4.0% by mass is not preferred because image density of a recorded matter may not be sufficiently obtained. On the other hand, the sum of the contents (% by mass) exceeding 10.0% by mass is not preferred because ink jet characteristics such as anti-sticking property may not be obtained.

[Verification Method of a Coloring Material]

The following verification methods (1) to (3) using high performance chromatography (HPLC) is applicable to the verification of whether the coloring material used in the present invention is contained in ink or not.

(1) Peak retention time (2) Maximum absorption wavelength for the peak of (1)

(3) M/Z (posi) and M/Z (nega) of the mass spectrum for the peak of (1)

The analysis conditions of high performance chromatography are as shown below. A liquid (ink) diluted with pure water by about 1,000 times was used as a sample for measurement. Then, analysis by high performance chromatography was performed under the following conditions to measure the peak retention time and the maximum absorption wavelength of the peak.

Column: SunFire $C_{18}$ (manufactured by Japan Waters Co., Ltd.), 2.1 mm×150 mm, column temperature: 40° C.

Flow rate: 0.2 mL/min

PDA: 200 nm to 700 nm

Mobile phase and gradient conditions: Table 1 below

TABLE 1

|  | 0 to 5 min. | 5 to 24 min. | 24 to 31 min. | 31 to 45 min. |
|---|---|---|---|---|
| A: Water | 85% | 85%→45% | 45%→0% | 0% |
| B: Methanol | 10% | 10%→50% | 50%→95% | 95% |
| C: 0.2 mol/L Aqueous ammonium acetate solution | 5% | 5% | 5% | 5% |

In addition, analysis conditions for a mass spectrum are as shown below. The mass spectrum of the resultant peak is measured under the following conditions, and the M/Z detected most strongly is measured for each of positive and negative.

Ionization method

ESI

Capillary voltage: 3.5 kV

Desolvation gas: 300° C.

Ion source temperature: 120° C.

Detector posi: 40V 200 to 1,500 amu/0.9 sec nega: 40V 200 to 1,500 amu/0.9 sec

The measurement was made under the above-described method and conditions for an exemplified compound 1 and an exemplified compound 3 which are specific examples of the first coloring material and an exemplified compound 6 which is a specific example of the second coloring material, as representative examples of respective coloring materials. Table 2 shows the resulting values of retention time, maximum absorption wavelength, M/Z (posi), and M/Z (nega). When the measurement is made under the same method and conditions as described above for an unknown ink and the resulting measured values are in the range of the values shown in Table 2, it can be determined that the ink includes a compound corresponding to the compound used in the present invention.

TABLE 2

| | Retention time (min) | Maximum absorption wavelength (nm) | M/Z posi | M/Z nega |
|---|---|---|---|---|
| Exemplified compound 1 | 18.0 to 19.0 | 500 to 520 | 990 to 993 | 987 to 990 |
| Exemplified compound 3 | 23.0 to 25.0 | 530 to 550 | 941 to 944 | 469 to 471 |
| Exemplified compound 6 | 34.0 to 35.0 | 545 to 565 | 1176 to 1179 | 1174 to 1177 |
| | 35.0 to 36.0 | 545 to 565 | 1176 to 1179 | 1174 to 1177 |

(Aqueous Medium)

One of water and an aqueous medium which is a mixed solvent of water and a water-soluble organic solvent can be used in the ink of the present invention. Deionized water (ion exchange water) is preferably used as the water. The content (% by mass) of water in ink is preferably from 10.0% by mass or more to 90.0% by mass or less based on the total ink mass.

The water-soluble organic solvent is not particularly limited as long as it is water-soluble, and examples thereof include alcohols, polyhydric alcohols, polyglycols, glycol ethers, nitrogen-containing polar solvents and sulfur-containing polar solvents. The content (% by mass) of the water-soluble organic solvent in ink is preferably from 5.0% by mass or more to 90.0% by mass or less, more preferably from 10.0% by mass or more to 50.0% by mass or less based on the total ink mass. When the content of the water-soluble organic solvent is lower than the above described range, reliability such as ejection stability may not be obtained in the case of using the ink for an ink jet recording apparatus. On the other hand, when the content of the water-soluble organic solvent is higher than the above described range, the viscosity of the ink may be increased to cause a poor ink supply.

Specific examples of the water-soluble organic solvent include: alkyl alcohols having from 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; one of ketones and ketoalcohols such as acetone and diacetone alcohol; ethers such as tetrahydrofuran and dioxane; polyalkylene glycols such as polyethylene glycol and polypropylene glycol; glycols such as ethylene glycol, propylene glycol, butylene glycol, diethylene glycol, triethylene glycol, hexylene glycol and thiodiglycol; alkylene glycols in which an alkylene group has from 2 to 6 carbon atoms such as 1,5-pentanediol, 1,6-hexanediol, 2-methyl-1,3-propanediol, 3-methyl-1,5-pentanediol and 1,2,6-hexanetriol; bis(2-hydroxyethyl) sulfone; lower alkyl ether acetates such as polyethylene glycol monomethyl ether acetate; polyhydric alcohol alkyl ethers such as ethylene glycol monomethyl ether, ethylene glycol monoethyl ether, diethylene glycol methyl ether, diethylene glycol ethyl ether, triethylene glycol monomethyl ether and triethylene glycol mono ethyl ether; N-methyl-2-pyrrolidone, 2-pyrrolidone and 1,3-dimethyl-2-imidazolidinone. Of course, the present invention is not limited to these. These water-soluble organic solvents can be used individually or in combination as required.

(Other Additives)

The ink of the present invention may contain a water-soluble organic compound which is solid at ordinary temperature such as polyhydric alcohols including trimethylolpropane and trimethylolethane, and urea derivatives including urea and ethyleneurea, besides the above-described components, if required. Further, the ink of the present invention may contain various additives such as a surfactant, a pH adjuster, a rust-inhibitor, antiseptics, an antifungal agent, an antioxidant, a reduction preventive, an evaporation accelerator, a chelating agent and a water-soluble polymer, as required.

<Other Inks>

Further, in order to form full color images, the ink of the present invention can be used in combination with an ink having a color tone different from the color tone of the ink of the present invention. The ink of the present invention is preferably used in combination with, for example, at least any one ink selected from the group consisting of black ink, cyan ink, magenta ink, yellow ink, red ink, green ink and blue ink. Furthermore, a so-called light ink which has substantially the same color tone as the color tone of each of these inks can also be used in combination. The coloring material for these inks or light inks may be a known coloring material or a newly synthesized coloring material.

<Recording Medium>

The recording medium to be used for forming images using the ink of the present invention may be any recording medium as long as it is a recording medium for recording by applying ink thereto. In the present invention, it is preferred to use a recording medium for ink jets in which coloring materials such as a dye and a pigment are allowed to adsorb to the particulates which form a porous structure of an ink receiving layer. It is particularly preferred to use a recording medium having a so-called void-absorbing type ink receiving layer which absorbs ink by the voids formed in the ink receiving layer on a support. The void-absorbing type ink receiving layer essentially includes particulates and may further include a binder and other additives as required.

Specifically, the followings can be used for the particulates: inorganic pigments such as silica, clay, talc, calcium carbonate, kaolin, aluminum oxide such as alumina and hydrated alumina, diatomaceous earth, titanium oxide, hydrotalcite and zinc oxide; and organic pigments such as a urea formalin resin, an ethylene resin and a styrene resin. These particulates can be used individually or in combination as required.

The binder includes a water-soluble polymer and latex, and specific examples thereof include the followings: polyvinyl alcohol, starch, gelatin and modified body thereof; gum arabic; cellulose derivatives such as carboxymethylcellulose, hydroxyethylcellulose and hydroxypropylmethylcellulose; vinyl copolymer latex such as SBR latex, NBR latex, methyl methacrylate-butadiene copolymer latex, functional group-modified polymer latex and an ethylene-vinyl acetate copolymer; polyvinyl pyrrolidone; and maleic anhydride and a copolymer thereof and an acrylate copolymer. These binders can be used individually or in combination as required.

In addition, additives can be used as required. Examples of the additives include a dispersant, a thickener, a pH adjuster, a lubricant, a fluidity modifier, a surfactant, a defoaming agent, a release agent, a fluorescent brightener, an ultraviolet absorber, an antioxidant and a dye fixing agent.

In particular, in forming an image using the ink of the present invention, it is preferred to use a recording medium in which an ink receiving layer is formed by using particulates having an average particle size of not more than 1 μm. Specific examples of the particulates include silica particulates and aluminum oxide particulates. Preferred silica particulates include those typified by colloidal silica. Commercially available colloidal silica can be used, but it is particularly preferred to use, for example, colloidal silica described in Japanese Patent Nos. 2803134 and 2881847. Preferred aluminum oxide particulates include hydrated alumina particulates (an alumina pigment).

Among the above alumina pigment, hydrated alumina such as pseudoboehmite represented by the following formula can be particularly mentioned as a suitable one:

$$AlO_{3-n}(OH)_{2n} \cdot mH_2O$$

wherein n is an integer of 1 to 3; and m is 0 to 10, preferably 0 to 5, provided that m and n are not simultaneously 0.

In many cases, $mH_2O$ also represents an eliminable aqueous phase which does not participate in the formation of $mH_2O$ crystal lattices. For this reason, m may take one of an integer and a value which is not an integer. Further, when this type of hydrated alumina is heated, m may reach 0.

The hydrated alumina can be produced by the following known methods. For example, it can be produced by hydrolysis of an aluminum alkoxide and sodium aluminate as disclosed in U.S. Pat. No. 4,242,271 and U.S. Pat. No. 4,202,870. Further, it can be produced by a method in which an aqueous solution of one of sodium sulfate and aluminum chloride is added to an aqueous solution of sodium aluminate to effect neutralization as disclosed in Japanese Patent Application Laid-Open No. S57-044605.

The recording medium preferably has a support for supporting the above-described ink receiving layer. Any material may be used for the support without any limitation as long as the material allows the ink receiving layer to be formed from the above-described porous particulates and forms a support which is rigid enough to be transported by a transport mechanism of an ink jet recording apparatus. For example, a paper support including a pulp raw material which essentially includes natural cellulose fibers can be used. A plastic support including a material such as polyester (for example, polyethylene terephthalate), cellulose triacetate, polycarbonate, polyvinyl chloride, polypropylene and polyimide can also be used. A resin-coated paper (example: RC paper) having a polyolefin resin coating layer, to which a white pigment is added, on at least one side of a base paper can also be used.

In particular, in the present invention, the pH of the surface of the recording medium is preferably from 3.0 or more to 8.0 or less. Further, in order to sufficiently obtain the effect of the present invention, the pH of the surface of the recording medium is particularly preferably from 4.0 or more to 6.0 or less.

<Ink Jet Recording Method>

The ink of the present invention is particularly preferably used for the ink jet recording method in which ink is ejected by an ink jet system to perform recording on a recording medium. The ink jet recording method includes a recording method in which ink is ejected by applying mechanical energy on the ink and a recording method in which ink is ejected by applying thermal energy on the ink. In particular, in the present invention, the ink jet recording method using thermal energy can be preferably used.

<Ink Cartridge>

A suitable ink cartridge for recording by using the ink of the present invention includes an ink cartridge provided with an ink storage portion for storing ink.

<Recording Unit>

A suitable recording unit for recording using the ink of the present invention includes a recording unit provided with an ink storage portion for storing the ink and a recording head for ejecting the ink. In particular, a recording unit can be preferably used in which the above recording head ejects the ink by applying thermal energy corresponding to a recording signal to the ink. In particular, a recording head having a heating portion surface in contact with liquid including at least one of metals and metal oxides is preferably used in the present invention. Specific examples of at least one of the metals and the metal oxides comprising the above heating portion surface in contact with liquid include metal such as Ta, Zr, Ti, Ni and Al, and metal oxides thereof.

<Ink Jet Recording Apparatus>

A suitable ink jet recording apparatus using the ink of the present invention includes an ink jet recording apparatus provided with an ink storage portion for storing the ink and a recording head for ejecting the ink. In particular, an ink jet recording apparatus can be mentioned in which the ink in the recording head having an ink storage portion for storing the ink is ejected by applying thermal energy corresponding to a recording signal to the ink.

A schematic constitution of a mechanism portion of an ink jet recording apparatus will be described below. An ink jet recording apparatus has a sheet feeding portion, a sheet conveying portion, a carriage portion, a sheet discharge portion, a cleaning portion and an external packaging portion for protecting the above portions and providing them with a design, each of which plays a role of each mechanism.

Figure 2:
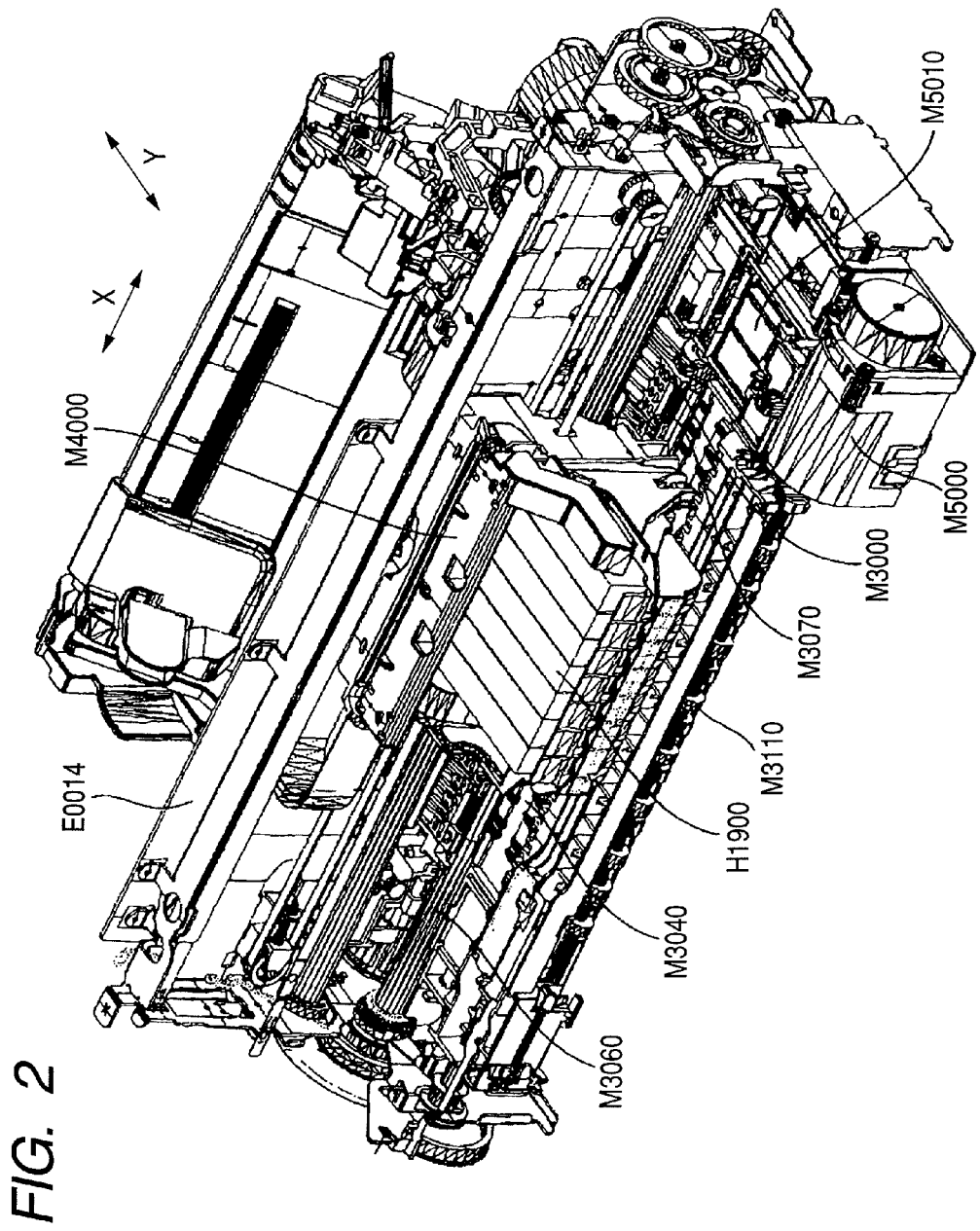
FIG. 2 is a perspective view of a mechanism portion of an ink jet recording apparatus.
Figure 3:
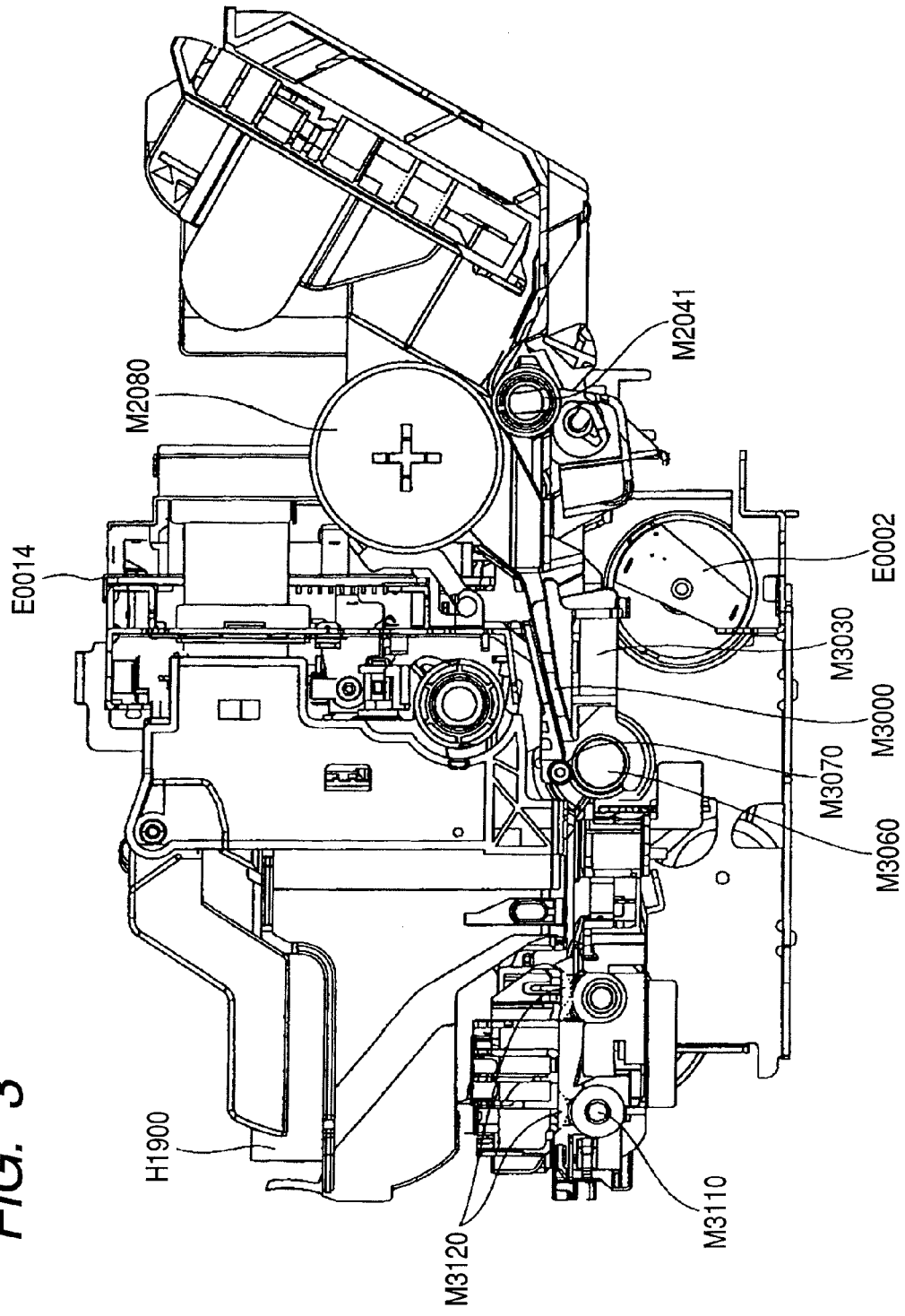
FIG. 3 is a sectional view of an ink jet recording apparatus.

FIG. 1 is a perspective view of an ink jet recording apparatus. FIGS. 2 and 3 are views for describing the internal mechanism of an ink jet recording apparatus, wherein FIG. 2 illustrates a perspective view seen from an upper right portion, and FIG. 3 illustrates the sectional side elevation of the ink jet recording apparatus.

When sheets are fed into the recording apparatus, only a specified number of recording media is sent to a nip portion comprising a sheet feeding roller M2080 and a separating roller M2041 in the sheet feeding portion including a sheet feeding tray M2060. The sent recording media are separated at the nip portion, and only the uppermost recording medium is conveyed. The recording medium conveyed to the sheet conveying portion is guided by a pinch roller holder M3000 and a paper guide flapper M3030 to be sent to a roller pair comprising a conveying roller M3060 and a pinch roller M3070. The roller pair comprising the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 4: details about the constitution will be described later) is arranged at a target image forming position, and ink is ejected to the recording medium according to a signal from an electrical substrate E0014. While recording is performed by the recording head H1001, main scanning in which a carriage M4000 scans in the column direction and sub scanning in which a recording medium is conveyed in the row direction by the conveying roller M3060 are alternately repeated, whereby an image is formed on the recording medium. Finally, the recording medium on which an image has been formed is pinched at a nip between a first sheet discharge roller M3110 and a spur M3120 in the sheet discharge portion, conveyed, and discharged to a sheet discharge tray M3160.

The cleaning portion cleans the recording head H1001 before and after forming an image. A pump M5000 is operated while capping the ejection orifice of the recording head H1001 with a cap M5010 so that unnecessary ink is sucked from the ejection orifice of the recording head H1001. Further, the ink remaining in the inside of the cap M5010 is sucked with the cap M5010 opened so as to prevent sticking and other harmful effects by the residual ink.

(Constitution of Recording Head)

Figure 4:
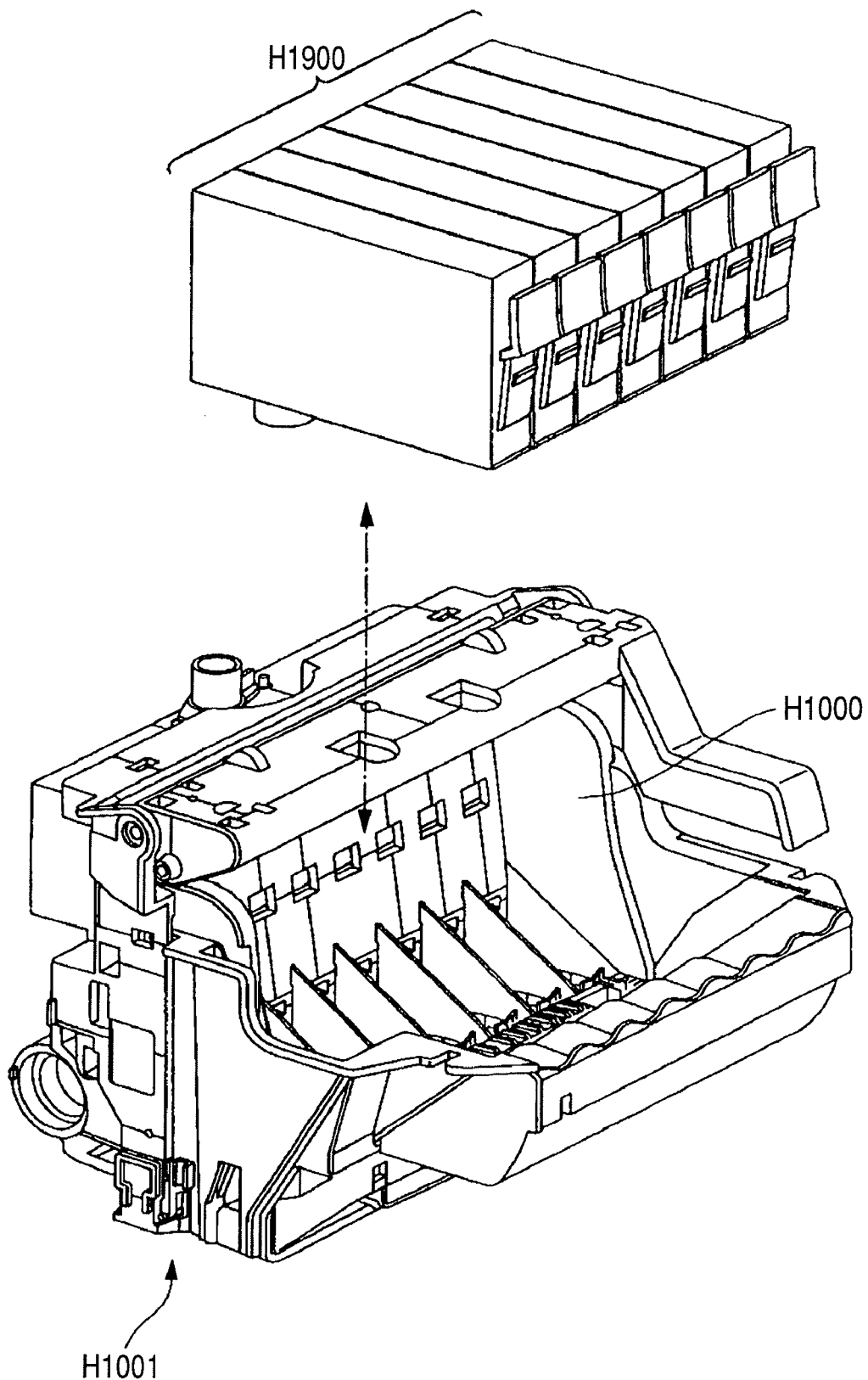
FIG. 4 is a perspective view illustrating the state of mounting an ink cartridge on a head cartridge.

The constitution of a head cartridge H1000 is described. FIG. 4 is a view illustrating the constitution of a head cartridge H1000 and how the ink cartridge H1900 is mounted on the head cartridge H1000. The head cartridge H1000 has a recording head H1001, a unit to mount an ink cartridge H1900 and a unit to supply ink to the recording head from the ink cartridge H1900, and is detachably mounted on a carriage M4000.

The ink jet recording apparatus forms images with yellow, magenta, cyan, black, light magenta, light cyan and green inks. Therefore, the ink cartridges H1900 are independently prepared for seven colors. Note that, the ink of the present invention is used for at least one of the above inks. In addition, as illustrated in FIG. 4, each ink cartridge H1900 is detachable relative to the head cartridge H1000. The ink cartridge H1900 can also be attached and detached in such a state that the head cartridge H1000 is mounted on the carriage M4000.

Figure 5:
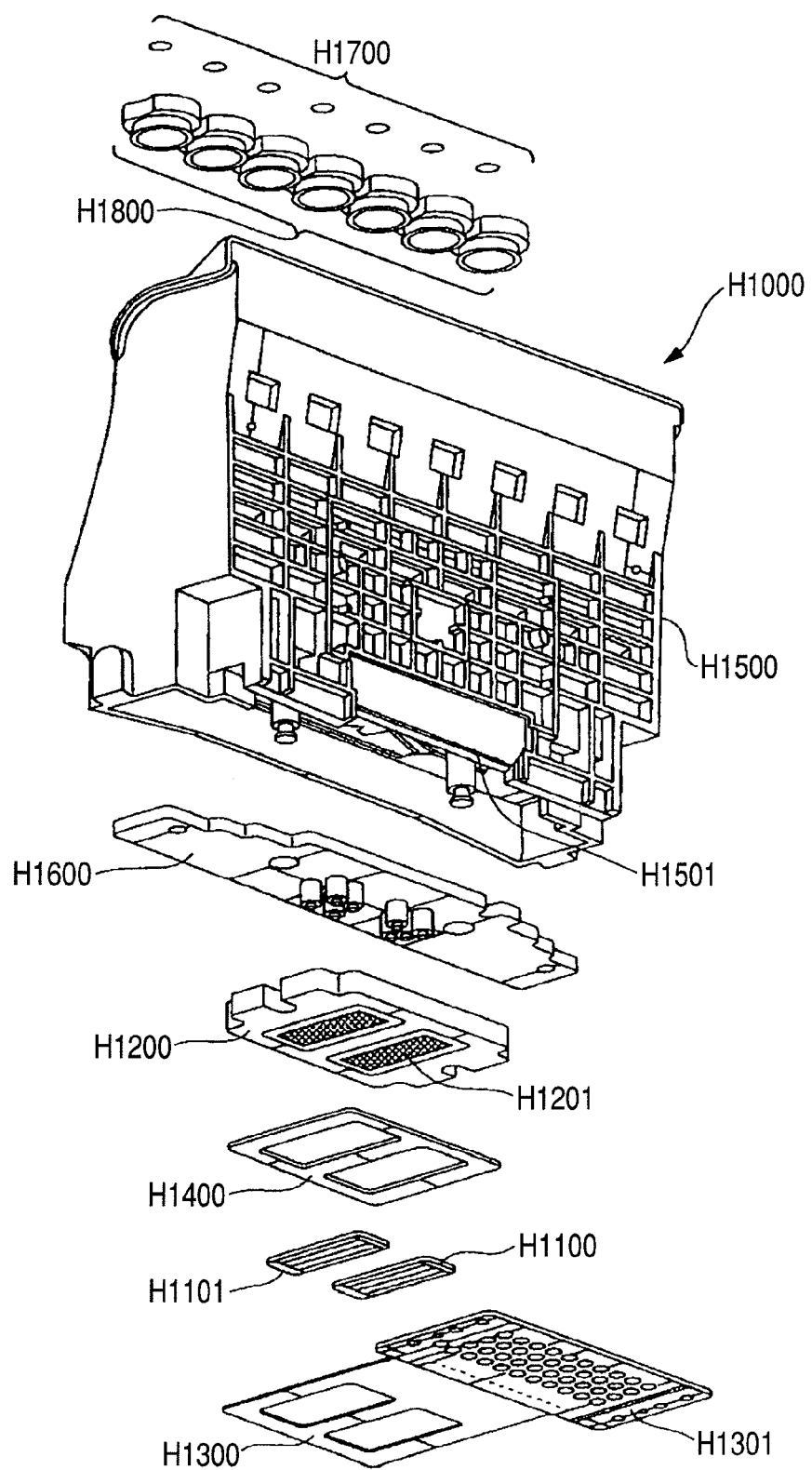
FIG. 5 is an exploded perspective view of a head cartridge.

FIG. 5 is an exploded perspective view of the head cartridge H1000. The head cartridge H1000 comprises a recording element substrate, a plate, an electrical wiring substrate H1300, a cartridge holder H1500, a flow path forming member H1600, a filter H1700 and a seal rubber H1800. The recording element substrate comprises a first recording element substrate H1100 and a second recording element substrate H1101, and the plate comprises a first plate H1200 and a second plate H1400.

Each of the first recording element substrate H1100 and the second recording element substrate H1101 is a Si substrate, and a plurality of recording elements (nozzles) for ejecting ink is formed on one side thereof by means of photolithography. Electrical wiring made of Al etc. to supply electric power to each recording element is formed by means of a film forming technique, and a plurality of ink flow paths corresponding to the individual recording elements is formed by photolithography. Further, ink supply ports for supplying ink to the plurality of ink flow paths are formed so as to be open on the rear surface.

Figure 6:
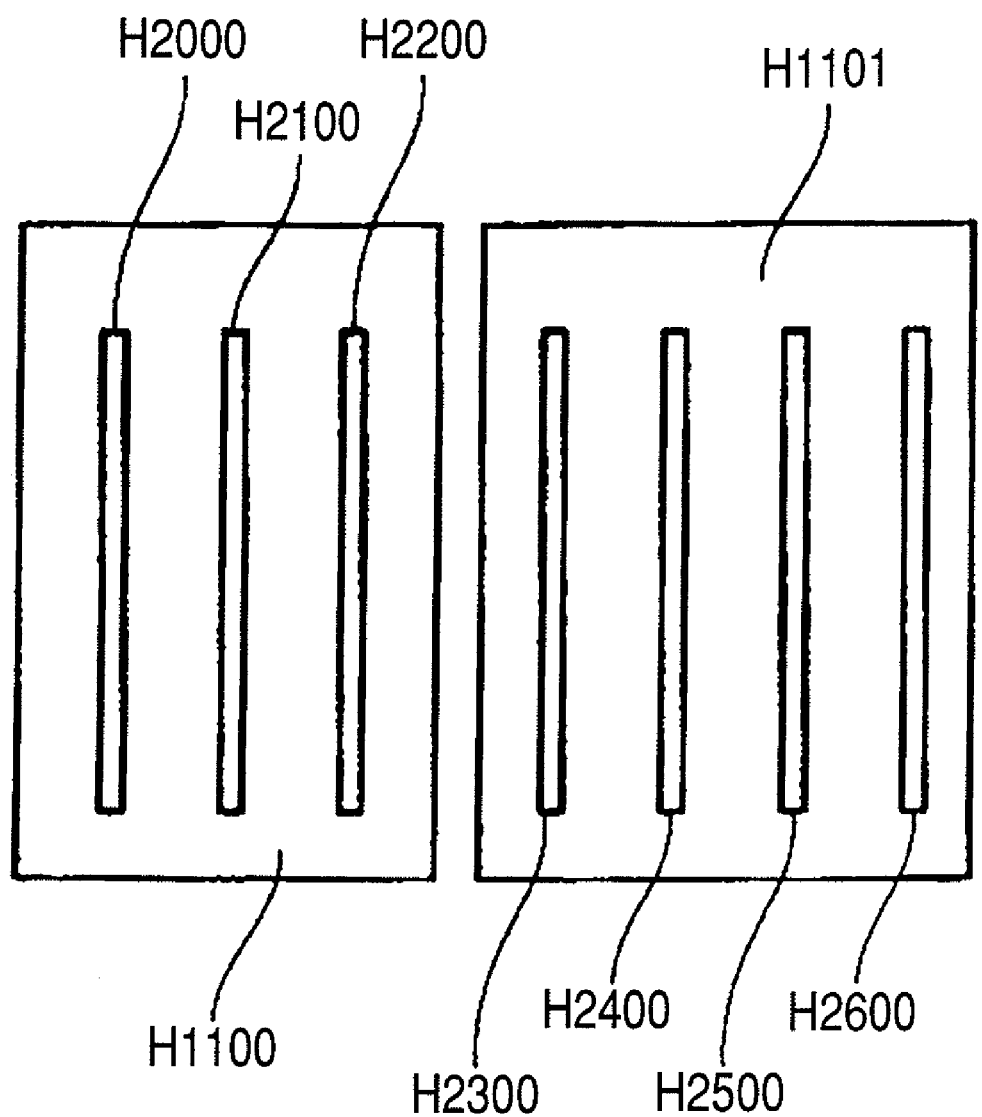
FIG. 6 is a front view illustrating a recording element substrate in a head cartridge.

FIG. 6 is an enlarged front view for describing the constitution of the first recording element substrate H1100 and the second recording element substrate H1101, which illustrates recording element trains H2000 to H2600 (hereinafter also referred to as nozzle trains) corresponding to different ink colors. The first recording element substrate H1100 has nozzle trains for three colors: a nozzle train H2000 for yellow ink, a nozzle train H2100 for magenta ink and a nozzle train H2200 for cyan ink. The second recording element substrate H1101 has nozzle trains for four colors: a nozzle train H2300 for light cyan ink, a nozzle train H2400 of black ink, a nozzle train H2500 for green ink and a nozzle train H2600 of light magenta ink.

Each nozzle train comprises 768 nozzles arranged at intervals of 1,200 dpi (dot/inch; reference value) in the conveying direction of a recording medium, and each nozzle ejects about 2 picoliter of ink. An opening area in each nozzle ejection orifice is set to be about 100 $\mu m^2$.

Hereinafter, the present invention will be described with reference to FIGS. 4 and 5. The first recording element substrate H1100 and the second recording element substrate H1101 are bonded and fixed to the first plate H1200, on which are formed ink supply ports H1201 for supplying ink to the first recording element substrate H1100 and the second recording element substrate H1101. The second plate H1400 having openings is also bonded and fixed to the first plate H1200. The second plate H1400 holds the electrical wiring substrate H1300 in such a manner that the electrical wiring substrate H1300, the first recording element substrate H1100 and the second recording element substrate H1101 are electrically connected.

The electrical wiring substrate H1300 applies electrical signals for causing each of the nozzles formed on the first recording element substrate H1100 and the second recording element substrate H1101 to eject ink. The electrical wiring substrate H1300 has: electrical wiring corresponding to each of the first recording element substrate H1100 and the second recording element substrate H1101; and an external signal input terminal H1301 which is positioned at the end portion of the electrical wiring to receive electrical signals from the ink jet recording apparatus. The external signal input terminal H1301 is positioned and fixed to the back surface side of the cartridge holder H1500.

A flow path forming member H1600 is fixed to a cartridge holder H1500 for holding the ink cartridges H1900 by means of, for example, ultrasonic welding. Thus, an ink flow path H1501 passing from the ink cartridges H1900 to the first plate H1200 is formed. A filter H1700 is arranged at the end portion on the ink cartridge side of the ink flow path H1501 engaged with the ink cartridges H1900 so that the filter H1700 prevents dust from entering from the outside. A seal rubber H1800 is mounted on the portion at which the ink flow path H1501 is engaged with the ink cartridges H1900 to prevent ink from evaporating from this portion.

Furthermore, as described above, the head cartridge H1000 is made up by connecting the cartridge holder portion with the recording head portion H1001 by the use of an adhesive. The cartridge holder portion comprises the cartridge holder H1500, the flow path forming member H1600, the filter H1700 and the seal rubber H1800, and the recording head portion H1001 comprises the first recording element substrate H1100, the second recording element substrate H1101, the first plate H1200, the electrical wiring substrate H1300 and the second plate H1400.

Description has been made here by taking, as an embodiment of a recording head, a recording head according to a thermal ink jet method that performs recording by means of an electrothermal converter (recording element) for generating thermal energy for causing ink to generate film boiling according to an electrical signal. As for the representative structure and principle, it is preferred to use basic principles discussed in, for example, U.S. Pat. Nos. 4,723,129 and 4,740,796. The method is applicable to any one of a so-called on-demand type and a so-called continuous type.

In particular, the method is effective for the on-demand type because of the following reason. At least one driving signal which corresponds to recording information and causes a sudden increase in temperature exceeding nuclear boiling is applied to electrothermal converters arranged corresponding to a liquid flow path holding ink, thereby causing the electrothermal converter to generate thermal energy and causing the ink to generate film boiling. As a result, an air bubble in the ink can be formed so as to be in one-to-one correspondence with the driving signal. The growth and contraction of the air bubble eject the ink through an ejection orifice, thereby forming at least one droplet. The driving signal is more preferably of a pulse shape because the growth and contraction of an air bubble can be performed immediately and appropriately, and hence the ink can be ejected with excellent responsiveness.

The ink of the present invention can also be suitably used in an ink jet recording apparatus utilizing mechanical energy as described below. The ink jet recording apparatus in such a form comprises a nozzle forming substrate having a plurality of nozzles, a pressure generating element arranged so as to be opposite to the nozzles and comprising a piezoelectric material and a conductive material, and an ink filling the surroundings of the pressure generating element, in which the pressure generating element is displaced by an applied voltage to eject the ink from the nozzles.

The ink jet recording apparatus is not limited to such apparatuses as described above in which a recording head and an ink cartridge are separated, and may be one in which a recording head and an ink cartridge are unified so that they are unseparable. The ink cartridge may also be separably or unseparably unified with the recording head to be mounted on a carriage, or may be mounted on a fixing portion of the ink jet recording apparatus to supply ink to a recording head through an ink supply member such as a tube. Further, when the ink cartridge is provided with a constitution for applying a suitable negative pressure to the recording head, the following constitution may be adopted. That is, an absorber may be arranged in an ink storage portion of the ink cartridge, or the ink cartridge may have a flexible ink storage bag and a spring portion for applying bias in the direction of expanding the internal volume of the bag. Further, the recording apparatus may adopt a serial recording method as described above, or may be in the form of a line printer obtained by aligning recording elements over the range corresponding to the entire width of a recording medium.

EXAMPLES

Hereinafter, the present invention will be described in more detail with reference to Examples and Comparative Examples. However, the present invention is not limited to the following Examples unless Examples depart from the gist of the present invention. Unless otherwise specified, the term "part(s)" of each ink component in Examples and Comparative examples represents "part(s) by mass".

<Preparation of Coloring Materials>

(Synthesis of Exemplified Compound 1)

(A) To 360 parts of xylene were successively added 94.8 parts of the compound of the following formula (1), 3.0 parts of sodium carbonate and 144.0 parts of ethyl benzoylacetate with stirring, and the resulting mixture was heated to a temperature of 140 to 150° C. and allowed to react for 8 hours. During the reaction, ethanol and water generated in the reaction were azeotropically distilled out of the system with xylene to complete the reaction. The reaction mixture was cooled to a temperature of 30° C., and 240 parts of methanol were added thereto. The resulting mixture was stirred for 30 minutes. Then, the precipitated solid was separated by filtration. The resulting solid was washed with 360 parts of methanol and then dried to obtain 124.8 parts of the compound of the following formula (2) as a light yellow needle crystal.

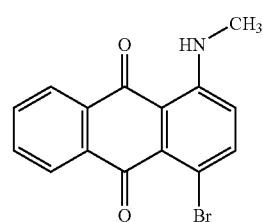

Formula 1

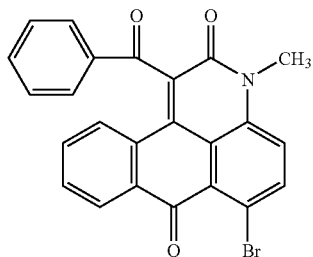

Formula 2

(B) To 300.0 parts of N,N-dimethylformamide were successively added 88.8 parts of the compound of the formula (2) obtained above, 75.0 parts of meta-aminoacetanilide, 24.0 parts of copper acetate monohydrate and 12.8 parts of sodium carbonate with stirring, and the resulting mixture was heated to a temperature of 120 to 130° C. and allowed to react for 3 hours. The reaction mixture was cooled to a temperature of about 50° C., and 120 parts of methanol were added thereto. The resulting mixture was stirred for 30 minutes. Then, the precipitated solid was separated by filtration. The resulting solid was washed with 500 parts of methanol and hot water of 80° C., and then dried to obtain 79.2 parts of the compound of the following formula (3) as a bluish red crystal.

Formula 3

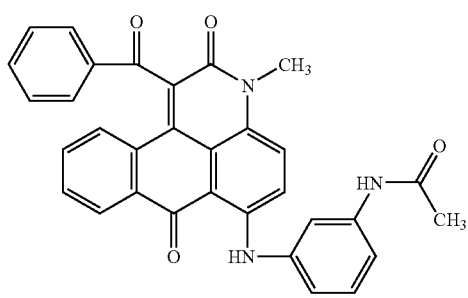

(C) To 130 parts of 98.0% sulfuric acid were added 170.0 parts of 28.0% fuming sulfuric acid with stirring under water cooling to prepare 300 parts of 12% fuming sulfuric acid. Thereto were added 51.3 parts of the compound of the formula (3) obtained above at a temperature of 50° C. or below under water cooling, and the resulting mixture was heated to a temperature of 85 to 90° C. and allowed to react for 4 hours. The resulting reaction mixture was poured into 600 parts of ice water, while temperature increase due to exothermic heat was prevented by adding ice to thereby keep the temperature of the mixture at 40° C. or below. The reaction mixture was mixed with additional water to obtain a mixture in an amount of 1000 parts, and then filtered to remove insoluble matter. To the resulting filtrate was added hot water to obtain a mixture in an amount of 1500 parts. Thereto were added 300 parts of sodium chloride while keeping the temperature of the mixture at 60 to 65° C., followed by stirring for 2 hours. Then, the precipitated crystal was separated by filtration. The resulting crystal was washed with 300 parts of a 20% aqueous sodium chloride solution and squeezed well to obtain 100.3 parts of a wet cake containing 59.2 parts of the compound of the following formula (4) as a red crystal.

Formula 4

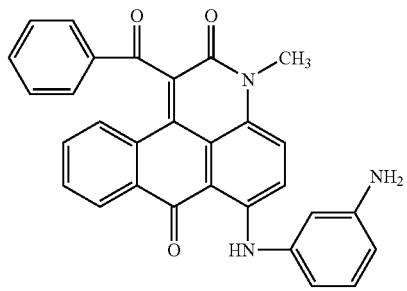

(D) To 60 parts of water were added 67.7 parts of the wet cake of the compound of formula (4) obtained above. Then, thereto were added 24 parts of a 25% aqueous sodium hydroxide solution, followed by stirring. In addition, thereto was added a 25% aqueous sodium hydroxide solution to dissolve the compound while adjusting the pH of the mixture to 3 to 4. On the other hand, to 60 parts of ice water was added 0.4 part of Lipal OH (trade name, anionic surfactant manufactured by Lion KK), and thereto were added 8.9 parts of cyanuric chloride, followed by stirring for 30 minutes to obtain a suspension liquid. The resulting suspension liquid was added to the solution containing the compound of formula (4) obtained above. Then, the resulting mixture was allowed to react at a temperature of 25 to 30° C. for 4 hours while keeping the pH of the mixture in the range of 2.7 to 3.0 using a 10% aqueous sodium hydroxide solution to thereby obtain a reaction mixture containing the compound of the following formula (5).

Formula 5

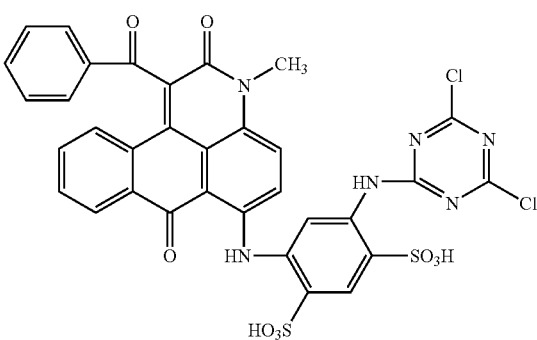

(E) To the reaction mixture containing the compound of formula (5) obtained above were added 9.5 parts of sodium p-phenolsulfonate dihydrate. Then, the temperature of the mixture was increased to a 50 to 55° C. while keeping the pH of the mixture in the range of 6.5±0.3 by adding a 25% aqueous sodium hydroxide solution. The mixture was allowed to react at this temperature range for 1 hour to thereby obtain a reaction mixture containing the compound of the following formula (6).

Formula 6

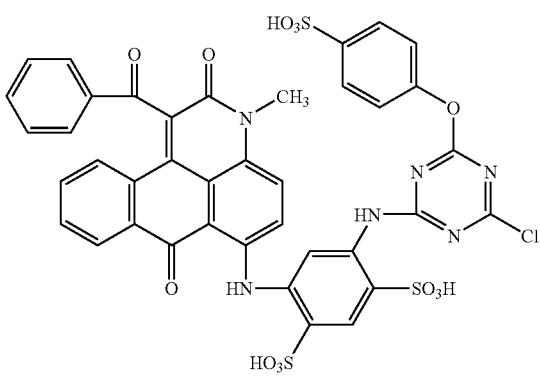

(F) To the reaction mixture containing the compound of formula (6) obtained above were added 1.2 parts of ethylenediamine. Then, the temperature of the mixture was increased to a 78 to 82° C. while keeping the pH of the mixture in the range of 7.8 to 8.2 by adding a 25% aqueous sodium hydroxide solution. The mixture was allowed to react at this temperature range for 1 hour. Subsequently, thereto was added water to obtain a mixture in an amount of about 350 parts, and then filtered to remove insoluble matter. To the resulting filtrate was added water to obtain a mixture in an amount of 400 parts. Thereto was added concentrated hydrochloric acid while keeping the temperature of the mixture at 55±2° C. to adjust the pH of the mixture to 3. Then, to the mixture were added 40 parts of sodium chloride over 15 minutes, followed by stirring for 30 minutes and further adding concentrated hydrochloric acid to adjust the pH of the mixture to 2. The resulting acidic aqueous solution was stirred for 1 hour, and the precipitated crystal was separated by filtration. The resulting crystal was washed with 100 parts of a 20% aqueous sodium chloride solution to thereby obtain a red wet cake containing the exemplified compound 1 as described above.

(G) The wet cake obtained above was added to 500 parts of methanol. The temperature of the resulting mixture was increased to 60 to 65° C., and the mixture was stirred for 1 hour. The precipitated crystal was separated by filtration, washed with methanol and dried to obtain the exemplified compound 1 in the form of free acid.

(Synthesis of Exemplified Compound 3)

The exemplified compound 3 was synthesized by the method described in example 4 of WO 2004/104108.

(Synthesis of Exemplified Compounds 5 and 6)

A dye f-1 described in Japanese Patent Application Laid-Open No. 2002-371213 was used as the exemplified compounds 5 and a compound d-5 described in Japanese Patent Application Laid-Open No. 2006-143989 was used as the exemplified compound 6.

(Synthesis of Other Coloring Materials)

The following comparative compound 1, which is an anthrapyridone dye, was synthesized by the method described in Japanese Patent Application Laid-Open No. 2003-192930. The following comparative compounds 2 and 3, which are an azo dye, were synthesized by the method described in Japanese Patent Application Laid-Open No. H08-073791. The following comparative compound 4 is C.I. direct yellow 132, which is an azo dye.

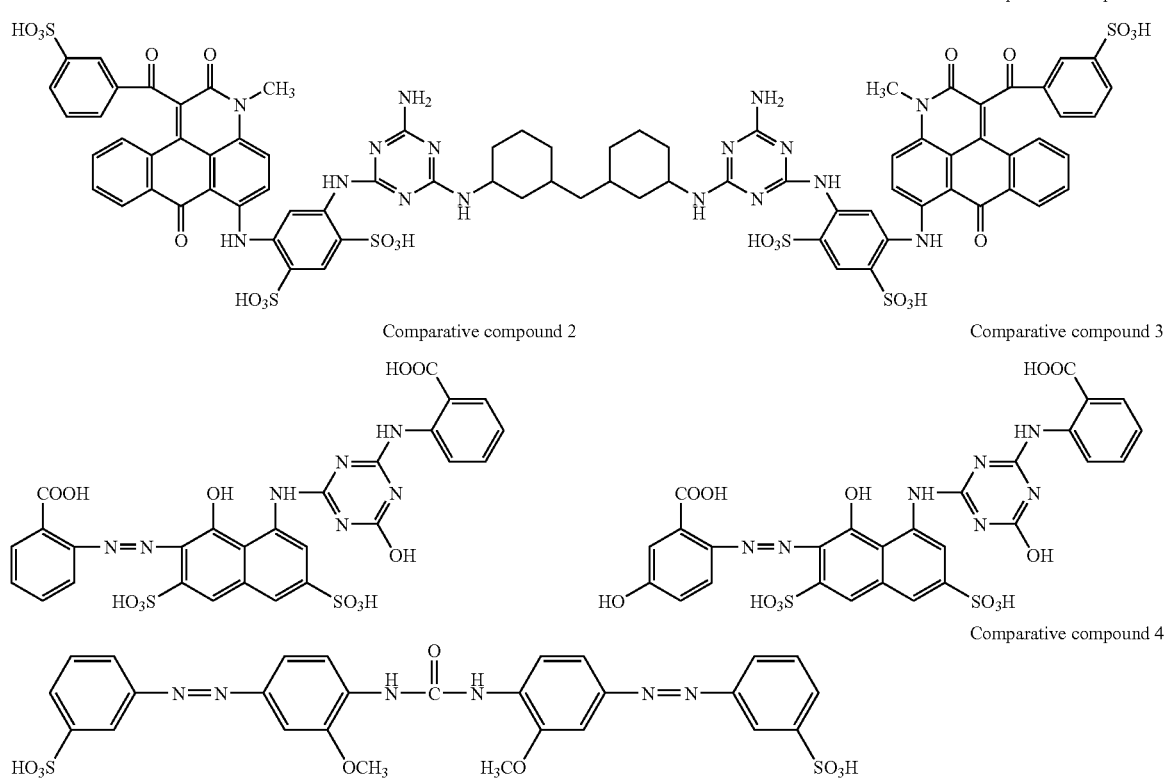

<Preparation of Ink>

The components shown in Tables 3 and 4 below were mixed and sufficiently stirred. Then, the resulting mixture was filtered through a filter having a pore size of 0.2 μm under pressure to prepare inks of Examples 1 to 11 and Comparative Examples 1 to 21.

TABLE 3

(Unit: % by mass)

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Anthrapyridone coloring materials | Exemplified compound 1 | 3.0 | 4.7 | 4.9 | 5.9 | 5.9 | | | 1.0 | 5.0 | 5.4 | 5.1 |
| | Exemplified compound 3 | | | | | | 3.9 | 3.9 | 5.0 | | | |
| | Comparative compound 1 | | | | | | | | | | | |
| Azo coloring materials | Exemplified compound 5 | | | | | 0.6 | 1.5 | | 1.0 | | | |
| | Exemplified compound 6 | 1.0 | 1.8 | 1.6 | 0.6 | | | 1.5 | | 0.5 | 0.6 | 0.6 |
| | Comparative compound 2 | | | | | | | | | | | |
| | Comparative compound 3 | | | | | | | | | | | |
| | Comparative compound 4 | | | | | | | | | | | |
| Ethylene glycol | | 9.0 | 9.0 | 9.0 | 9.0 | 9.0 | 9.0 | 9.0 | 9.0 | 9.0 | 9.0 | 9.0 |
| Diethylene glycol | | 9.0 | 9.0 | 9.0 | 9.0 | 9.0 | 9.0 | 9.0 | 9.0 | 9.0 | 9.0 | 9.0 |
| Acetylenol E100 (*1) | | 1.0 | 1.0 | 1.0 | 1.0 | 1.0 | 1.0 | 1.0 | 1.0 | 1.0 | 1.0 | 1.0 |
| Pure water | | 77.0 | 74.5 | 74.5 | 74.5 | 74.5 | 75.6 | 75.6 | 74.0 | 75.5 | 75.0 | 75.3 |
| First coloring material/Second coloring material (*2) | | 3.0 | 2.6 | 3.1 | 9.8 | 9.8 | 2.6 | 2.6 | 6.0 | 10.0 | 9.0 | 8.5 |

(*1) Manufactured by Kawaken Fine Chemicals co., Ltd.
(*2) Content of first coloring material/content of second coloring material

TABLE 4

(Unit: % by mass)

| | | Comparative Examples | | | | | | |
|---|---|---|---|---|---|---|---|---|
| | | 1 | 2 | 3 | 4 | 5 | 6 | 7 |
| Anthrapyridone coloring materials | Exemplified compound 1 | 2.8 | 3.8 | 4.6 | 6.2 | | | |
| | Exemplified compound 3 | | | | | 2.8 | 3.8 | 4.6 |
| | Comparative compound 1 | | | | | | | |
| Azo coloring materials | Exemplified compound 5 | 1.2 | 0.37 | 1.9 | 0.3 | 1.2 | 0.2 | 1.9 |
| | Exemplified compound 6 | | | | | | | |
| | Comparative compound 2 | | | | | | | |
| | Comparative compound 3 | | | | | | | |
| | Comparative compound 4 | | | | | | | |
| Ethylene glycol | | 9.0 | 9.0 | 9.0 | 9.0 | 9.0 | 9.0 | 9.0 |
| Diethylene glycol | | 9.0 | 9.0 | 9.0 | 9.0 | 9.0 | 9.0 | 9.0 |
| Acetylenol E100 (*1) | | 1.0 | 1.0 | 1.0 | 1.0 | 1.0 | 1.0 | 1.0 |
| Pure water | | 77.0 | 76.83 | 74.5 | 74.5 | 77.0 | 77.0 | 74.5 |
| First coloring material/Second coloring material (*2) | | 2.3 | 10.3 | 2.4 | 20.7 | 2.3 | 19.0 | 2.4 |

| | | Comparative Examples | | | | | | |
|---|---|---|---|---|---|---|---|---|
| | | 8 | 9 | 10 | 11 | 12 | 13 | 14 |
| Anthrapyridone coloring materials | Exemplified compound 1 | | 6.5 | | | | 4.8 | |
| | Exemplified compound 3 | 6.2 | | | 6.5 | | 1.2 | |
| | Comparative compound 1 | | | | | | | |
| Azo coloring materials | Exemplified compound 5 | 0.3 | | | 6.5 | | | 4.8 |
| | Exemplified compound 6 | | | | | 6.5 | | 1.2 |
| | Comparative compound 2 | | | | | | | |
| | Comparative compound 3 | | | | | | | |
| | Comparative compound 4 | | | | | | | |

TABLE 4-continued (Unit: % by mass)

| | | | | | | | |
|---|---|---|---|---|---|---|---|
| Ethylene glycol | 9.0 | 9.0 | 9.0 | 9.0 | 9.0 | 9.0 | 9.0 |
| Diethylene glycol | 9.0 | 9.0 | 9.0 | 9.0 | 9.0 | 9.0 | 9.0 |
| Acetylenol E100 (*1) | 1.0 | 1.0 | 1.0 | 1.0 | 1.0 | 1.0 | 1.0 |
| Pure water | 74.5 | 74.5 | 74.5 | 74.5 | 74.5 | 75.0 | 75.0 |
| First coloring material/Second coloring material (*2) | 20.7 | — | — | 0.0 | 0.0 | — | 0.0 |

| | | Comparative Examples | | | | | | |
|---|---|---|---|---|---|---|---|---|
| | | 15 | 16 | 17 | 18 | 19 | 20 | 21 |
| Anthrapyridone coloring materials | Exemplified compound 1 | 4.8 | 4.8 | 4.8 | | | | |
| | Exemplified compound 3 | | | | | | | |
| | Comparative compound 1 | | | | 2.0 | 2.0 | 5.5 | 5.5 |
| Azo coloring materials | Exemplified compound 5 | | | | 1.0 | | 0.8 | |
| | Exemplified compound 6 | | | | | 1.0 | | 0.8 |
| | Comparative compound 2 | 1.2 | | | | | | |
| | Comparative compound 3 | | 1.2 | | | | | |
| | Comparative compound 4 | | | 1.2 | | | | |
| Ethylene glycol | | 9.0 | 9.0 | 9.0 | 9.0 | 9.0 | 9.0 | 9.0 |
| Diethylene glycol | | 9.0 | 9.0 | 9.0 | 9.0 | 9.0 | 9.0 | 9.0 |
| Acetylenol E100 (*1) | | 1.0 | 1.0 | 1.0 | 1.0 | 1.0 | 1.0 | 1.0 |
| Pure water | | 75.0 | 75.0 | 75.0 | 78.0 | 78.0 | 74.7 | 74.7 |
| First coloring material/Second coloring material (*2) | | — | — | — | 0.0 | 0.0 | 0.0 | 0.0 |

(*1) Manufactured by Kawaken Fine Chemicals co., Ltd.
(*2) Content of first coloring material/content of second coloring material <Preparation of a Recording Medium>

A resin composition containing 70 parts of low density polyethylene, 20 parts of high density polyethylene and 10 parts of titanium oxide was applied to both sides of a base paper with a basis weight of 155 g/m² so that the composition is applied in an amount of 25 g/m² to thereby produce a supporting member covered with the resin. Then, an ink receiving layer including hydrated alumina and polyvinyl alcohol as principal components was formed on the resulting supporting member. Thus, a recording medium was produced which includes a void type ink receiving layer and has a surface pH after 3 minutes of 5.0 as measured according to the JAPAN TAPPI paper pulp test method No. 49-1.

<Evaluation>

Each ink of Examples and Comparative examples obtained above was loaded into the ink jet recording apparatus (trade name: PIXUS iP8600) using thermal energy. Recording conditions were set to a temperature of 23° C., a relative humidity of 55%, a recording density of 2,400 dpi×1,200 dpi and an ejection of 2.5 pL. Then, an image in which the recording duty was changed from 0% to 100% in 10% increments was formed on the recording medium obtained above, and the image was air-dried for 24 hours at a temperature of 23° C. and a relative humidity of 55%. Color tone (hue angle and optical density) and image fastness (lightfastness and ozone resistance) were then evaluated by the method as described below.

(Color Tone: Hue Angle)

The image portion in which the recording duty is 100% in the recorded matter obtained above was measured for a* and b* in the L*a*b* chromatic system specified by CIE (International Commission on Illumination). Note that the values of a* and b* were measured using a spectrophotometer (trade name: Spectrolino; manufactured by Gretag Macbeth) under the conditions of a light source of D50 and a field of view of 2°. The respective hue angles (H°) were calculated from the values of the resulting a* and b* based on the following formula (A) to evaluate color tone (hue angle). The criteria of color tone (hue angle) are as described below, and the evaluation results obtained by the criteria are shown in Table 5. In the following criterion for evaluation, A and B represent an ink having a desirable magenta color tone, and C represents an ink unacceptable as magenta color tone.

In $a^* \geq 0, b^* \geq 0$ (the first quadrant): $H°=\tan^{-1}(b^*/a^*)$

In $a^* \leq 0, b^* \geq 0$ (the second quadrant): $H°=180+\tan^{-1}(b^*/a^*)$

In $a^* \leq 0, b^* \leq 0$ (the third quadrant): $H°=180+\tan^{-1}(b^*/a^*)$

In $a^* \geq 0, b^* \leq 0$ (the fourth quadrant): $H°=360+\tan^{-1}(b^*/a^*)$      Formula (A)

A: H is from 0 or more to 5 or less.
B: H is one of from more than 5 to 10 or less and from 350 or more to less than 360.
C: H is between more than 10 and less than 350.

(Color Tone: Optical Density)

The image portion in which the recording duty is 100% in the recorded matter obtained above was measured for optical density using a spectrophotometer (trade name: Spectrolino; manufactured by Gretag Macbeth) to evaluate color tone (optical density). The criteria for evaluation of color tone (optical density) are as described below, and the resulting evaluation results are shown in Table 5. In the following criteria for evaluation, A and B represent the level acceptable as the optical density of magenta, and C represents the level unacceptable as the optical density of magenta since the optical density is so low that an image is light-colored.

A: Optical density is 2.0 or more.
B: Optical density is from 1.5 or more to less than 2.0.
C: Optical density is less than 1.5.

(Image Fastness: Lightfastness)

The image portion in which the recording duty is 50% in the recorded matter obtained above was measured for L*, a* and b* in the L*a*b* chromatic system specified by CIE (International Commission on Illumination) (referred to as the "Lab values before lightfastness test"). This recorded matter was then exposed for 168 hours using a super xenon testing machine (trade name: SX-75, manufactured by Suga Test Instruments Co., Ltd.) under the conditions of an irradiation intensity of 100 kilolux, a relative humidity of 60% and a vessel temperature of 24° C. Then, the image portion in which the recording duty is 50% in the recorded matter was measured for L*, a* and b* (referred to as the "Lab values after lightfastness test"). Note that the L*, a* and b* were measured using a spectrophotometer (Spectrolino; manufactured by Gretag Macbeth) under the conditions of a light source of D50 and a field of view of 2°. From the resulting Lab values before and after the lightfastness test, color difference (ΔE) was calculated based on the following formula (B) to evaluate lightfastness. The criteria of lightfastness are as described below, and the evaluation results obtained by the criteria are shown in Table 5. In the following criteria for evaluation, A and B represent the acceptable level, and C represents the unacceptable level because the degree of image fading after the lightfastness test is large.

$$\Delta E = \sqrt{(L_1-L_2)^2+(a_1-a_2)^2+(b_1-b_2)^2} \quad \text{Formula (B)}$$

$L_1, a_1, b_1$: Lab values before light fastness test $L_2, a_2, b_2$: Lab values after light fastness test A: ΔE is less than 17.

B: ΔE is from 17 or more to less than 20.

C: ΔE is 20 or more.

(Image Fastness: Ozone Resistance)

The image portion in which the recording duty is 50% in the recorded matter obtained above was measured for L*, a* and b* in the L*a*b* chromatic system specified by CIE (International Commission on Illumination) (referred to as the "Lab values before ozone resistance test"). This recorded matter was then exposed for 4 hours using ozone test equipment (trade name: OMS-H, manufactured by Suga Test Instruments Co., Ltd.) under the conditions of an ozone gas concentration of 10 ppm, a relative humidity of 60% and a vessel temperature of 24° C. Then, the image portion in which the recording duty is 50% in the recorded matter was measured for L*, a* and b* (referred to as the "Lab values after ozone resistance test"). Note that the L*, a* and b* were measured using a spectrophotometer (Spectrolino; manufactured by Gretag Macbeth) under the conditions of a light source of D50 and a field of view of 2°. From the resulting Lab values before and after the ozone resistance test, color difference (ΔE) was calculated based on the following formula (C) to evaluate ozone resistance. The criteria of ozone resistance are as described below. The evaluation results are shown in Table 5. In the following criteria for evaluation, A and B represent the acceptable level, and C represents the unacceptable level because the degree of image fading after the ozone resistance test is large.

$$\Delta E = \sqrt{(L_1-L_2)^2+(a_1-a_2)^2+(b_1-b_2)^2} \quad \text{Formula (C)}$$

$L_1, a_1, b_1$: Lab values before ozone resistance test $L_2, a_2, b_2$: Lab values after ozone resistance test A: ΔE is less than 2.

B: ΔE is from 2 or more to less than 4.

C: ΔE is 4 or more.

TABLE 5

|  |  | Color tone | | Light fastness | Ozone resistance |
|---|---|---|---|---|---|
|  |  | Hue angle | Optical density |  |  |
| Examples | 1 | B | B | B | A |
|  | 2 | B | A | A | A |
|  | 3 | B | A | A | A |
|  | 4 | A | A | A | A |
|  | 5 | A | A | A | B |
|  | 6 | A | A | B | B |
|  | 7 | A | A | B | A |
|  | 8 | B | A | B | B |
|  | 9 | A | A | A | A |
|  | 10 | A | A | A | A |
|  | 11 | B | A | A | A |
| Comparative Examples | 1 | B | B | C | B |
|  | 2 | C | C | C | B |
|  | 3 | B | B | C | B |
|  | 4 | B | B | B | C |
|  | 5 | C | B | C | B |
|  | 6 | C | C | C | B |
|  | 7 | C | B | B | B |
|  | 8 | C | B | B | B |
|  | 9 | C | B | C | B |
|  | 10 | C | B | C | B |
|  | 11 | C | A | C | B |
|  | 12 | C | A | C | B |
|  | 13 | C | B | C | B |
|  | 14 | C | A | C | B |
|  | 15 | C | B | C | C |
|  | 16 | C | B | C | C |
|  | 17 | C | C | C | C |
|  | 18 | C | C | C | C |
|  | 19 | C | C | C | C |
|  | 20 | C | B | C | C |
|  | 21 | C | B | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-120475, filed May 1, 2007, and No. 2008-107005, filed Apr. 16, 2008, which are hereby incorporated by reference herein in their entirety.

What is claimed is:

1. An ink jet ink comprising at least two coloring materials of a first coloring material and a second coloring material, wherein the first coloring material is (a) a compound represented by the following general formula (I):

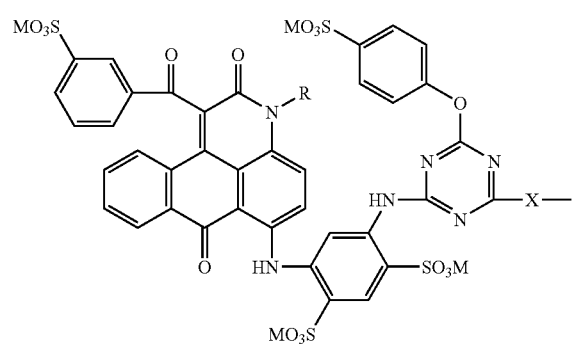

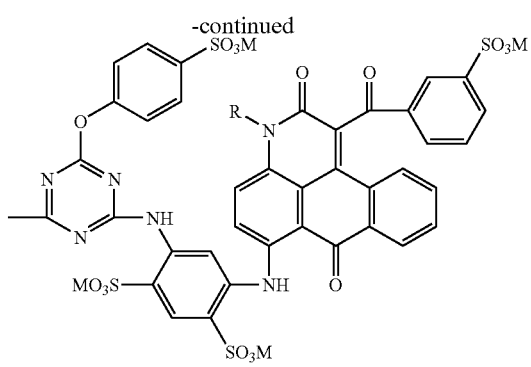

wherein R independently represents a hydrogen atom, an alkyl group, a hydroxyalkyl group, a cyclohexyl group, a monoalkylaminoalkyl group, or a dialkylaminoalkyl group; M independently represents a hydrogen atom, an alkali metal, ammonium, or organic ammonium; and X represents a linking groups; and/or (b) a compound represented by the following general formula (II):

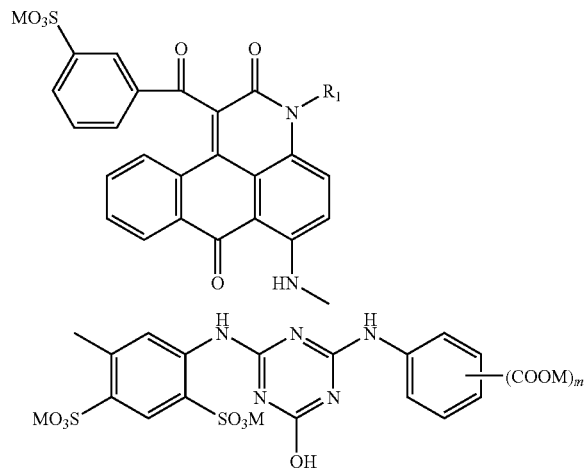

wherein $R_1$ represents an hydrogen atom or an alkyl group; m represents an integer of 1 to 3; and M independently represents a hydrogen atom, an alkali metal, ammonium or organic ammonium, and wherein the second coloring material is a compound represented by the following general formula (III):

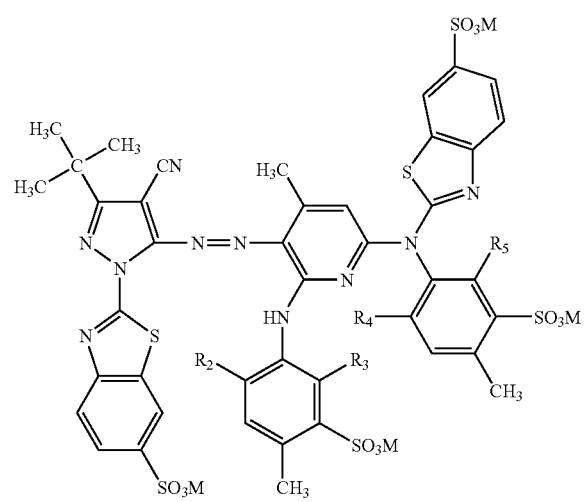

wherein $R_2$, $R_3$, $R_4$, and $R_5$, each independently represent an alkyl group; and M independently represents a hydrogen atom, an alkali metal, ammonium, or organic ammonium, and wherein the mass ratio of the content (% by mass) of the first coloring material to the content (% by mass) of the second coloring material is from 2.5 or more to 10.0 or less.

2. The ink jet ink according to claim 1, wherein the first coloring material comprises at least a compound represented by the general formula (I).

3. An ink jet recording method in which ink is ejected by an ink jet system to perform recording on a recording medium, wherein the ink is an ink jet ink according to claim 1.

4. An ink cartridge provided with an ink storage portion for storing ink, wherein the ink is an ink jet ink according to claim 1.

5. A recording unit provided with an ink storage portion for storing ink and a recording head for ejecting ink, wherein the ink is an ink jet ink according to claim 1.

6. An ink jet recording apparatus provided with an ink storage portion for storing ink and a recording head for ejecting ink, wherein the ink is an ink jet ink according to claim 1.

7. The ink jet ink according to claim 1, wherein X in the general formula (I) is the following linking group 1,

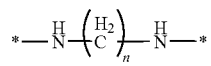

wherein n represents 2 to 8, and each symbol "*" represents a binding site to one of two different triazine rings.

8. The ink jet ink according to claim 1, wherein the mass ratio is from 9.0 or more to 10.0 or less.

9. The ink jet ink according to claim 1, wherein the content (% by mass) of the first coloring material in the ink is in the range of from 2.5% by mass or more to 10.0% by mass or less based on the total ink mass.

10. The ink jet ink according to claim 1, wherein the content (% by mass) of the second coloring material in the ink is in the range of from 0.5% by mass or more to 2.0% by mass or less based on the total ink mass.

11. The ink jet ink according to claim 1, wherein the sum of the contents (% by mass) of the first coloring material and the second coloring material in the ink is in the range of from 4.0% by mass or more to 10.0% by mass or less based on the total ink mass.

* * * * *